(12) United States Patent
Zenger et al.

(10) Patent No.: US 9,990,389 B1
(45) Date of Patent: Jun. 5, 2018

(54) SYSTEMS AND METHODS FOR GENERATING EVENT STREAM DATA

(71) Applicant: Visier Solutions, Inc., Vancouver (CA)

(72) Inventors: Geoffrey Benjamin Zenger, Coquitlam (CA); Ryan James Moore, Vancouver (CA); Wenbo Jiang, Richmond (CA)

(73) Assignee: Visier Solutions, Inc., Vancouver, British Columbia ( * ) Notice: Subject to any disclaimer, the term of this patent is extended or adjusted under 35 U.S.C. 154(b) by 0 days. days.

(21) Appl. No.: 15/617,574

(22) Filed: Jun. 8, 2017

(51) Int. Cl.
*G06F 17/30* (2006.01)

(52) U.S. Cl.
CPC .. *G06F 17/30365* (2013.01); *G06F 17/30292* (2013.01); *G06F 17/30368* (2013.01); *G06F 17/30516* (2013.01)

(58) Field of Classification Search
USPC ........................................ 707/725, 746, 694
See application file for complete search history.

(56) References Cited

U.S. PATENT DOCUMENTS

| | | | |
|---|---|---|---|
| 2010/0287209 A1* | 11/2010 | Hauser | G06F 17/3089 707/803 |
| 2011/0212430 A1 | 9/2011 | Smithmier et al. | |
| 2013/0268490 A1 | 10/2013 | Keebler et al. | |
| 2014/0380090 A1 | 12/2014 | Kobayashi et al. | |
| 2015/0154524 A1 | 6/2015 | Borodow et al. | |
| 2015/0161214 A1 | 6/2015 | Kali et al. | |
| 2015/0220883 A1 | 8/2015 | B'far et al. | |
| 2015/0378587 A1 | 12/2015 | Falaki et al. | |
| 2015/0379065 A1 | 12/2015 | Yoshizawa et al. | |
| 2016/0154692 A1* | 6/2016 | Heinz | G06F 11/0772 714/2 |
| 2016/0219089 A1 | 7/2016 | Murthy et al. | |
| 2016/0294543 A1 | 10/2016 | Lee et al. | |
| 2017/0098002 A1 | 4/2017 | Byrnes et al. | |
| 2017/0192872 A1 | 7/2017 | Awad et al. | |
| 2017/0208371 A1 | 7/2017 | Pettis et al. | |

OTHER PUBLICATIONS

"Event stream processing", wikipedia.com, <https://en.wikipedia.org/wiki/Event_stream_processing>, retrieved Dec. 7, 2016, 2 pages.
"Event-stream", github.com, <https://github.com/dominictarr/event-stream>, retrieved Dec. 7, 2016, 6 pages.

(Continued)

*Primary Examiner* — Hung T Vy
(74) *Attorney, Agent, or Firm* — Toler Law Group, PC

(57) ABSTRACT

A method includes receiving, at a processor, event stream data, the event stream data including a plurality of events associated with changes to an instance of a subject. The method further includes receiving, at the processor of the computing device, input indicating correction data. The method further includes outputting, from the processor of the computing device, modified event stream data to a storage device. The modified event stream data is generated based on the correction data by modifying an event of the event stream data, adding a first event to the event stream data, deleting a second event from the event stream data, or a combination thereof.

17 Claims, 22 Drawing Sheets

(56) References Cited

OTHER PUBLICATIONS

"Real-Time Big Datal ntegration", talend.com, <https://www.talend.com/products/real-time-big-data>, retrieved Dec. 7, 2017, 12 pages.

"Rule Point Complex Event Processing", informatica.com, <https://www.informatica.com/products/data-integration/real-time-integration/rulepoint-complex-event-processing.html#fbid=lwza6SeSvFJ>, retrieved Dec. 7, 2016, 2 pages.

"Event Stream Processing", sas.com, <http://www.sas.com/en_sg/software/data-management/event-stream-processing.html>, retrieved Dec. 7, 2016, 6 pages.

"Putting Apache Kafka to Use: A Practical Guide to Building a Stream Data Platform (Part 1)", confluent.io, <https://www.confluent.io/blog/stream-data-platform-1/>, retrieved Jan. 31, 2017, 11 pages.

"Putting Apache Kafka to Use: A Practical Guide to Building a Stream Data Platform (Part 2)", confluent.io, <https://www.confluent.io/blog/stream-data-platform-2/>, retrieved Jan. 31, 2017, 14 pages.

\* cited by examiner

200

First Schema ⟋ 112
```
"fields" : [
        {"name" : "ID_col" : "type" : "long" , "doc" : "Employee Identifier"},
        {"name" : "Date_col" : "type" : "long" , "doc" : "Timestamp"},
        {"name" : "Title" : "type" : "String" , "doc" : "Employee title"},
        {"name" : "Name" : "type" : "String" , "doc" : "Employee Name"},
        {"name" : "Address_1" : "type" : "String" , "doc" : "Employee address line 1"},
        {"name" : "Address_2" : "type" : "String" , "doc" : "Employee address line 2"}
]
```

Second Schema ⟋ 114
```
"fields" : [
        {"name" : "Date_col" : "type" : "long" , "doc" : "This is a timestamp"},
        {"name" : "ID_col" : "type" : "long" , "doc" : "This is an employee ID"},
        {"name" : "Name" : "type" : "String" , "doc" : "This is an employee's name"},
        {"name" : "Address" : "type" : "String" , "doc" : "This is an employee's address"},
        {"name" : "Rank" : "type" : "String" , "doc" : "This is an employee's rank"}
        ]
```

*FIG. 2*

SYSTEMS AND METHODS FOR GENERATING EVENT STREAM DATA

BACKGROUND

Use of computing devices and software is enabling advanced analytics to be performed on data sets from various sources, such as delimited files, database connectors, or in-memory tables. Data sets from different sources may be structured according to different schemas. For example, first data from a first source may be structured according to a first schema and second data from a second data source may be structured according to a second schema. The schemas may describe different logical structures for the respective data. For example, a schema may describe names, ordering, and data types of data fields (e.g., columns). A computing device that performs the advanced analytics may be unable to recognize or to process data structured according to a schema that differs from a schema that is "known" to the computing device.

To address schema changes, some organizations may dedicate developer resources to program a new data input job (e.g., an extraction, transformation, and loading (ETL) tool) each time the schema used by a data source changes. Because data processing rules and logic may typically be written against a source or a target schema, new data input jobs may need to be created any time a source schema or a target schema changes. Rules and logic that are written for a specific source schema or target schema may not be applicable or reusable for other schemas, even when those other schemas represent data expressing the same problem. In addition, a change to a source schema may result in the inability to load and analyze old source data that used an earlier schema, which can limit the ability to perform analytics that utilize comparisons to historical data. Custom data loading/translation tools can also be slow to execute and unsuitable for execution on multi-processor or other parallel computing architectures.

In some cases, data sources may include inaccurate or old data. The custom data loading/translation tools described above may correct errors by altering the data source, but doing so may result in loss of the original data (and, by extension, data auditing ability) and may also require that the corrections be determined anew each time the incorrect data is loaded. For example, if new data is received at the end of each month for the preceding three months, then an error occurring for data corresponding to April 15th may need to be detected and corrected three times: in the data sources (e.g., files) received April 30th, May 31st, and June 30th.

BRIEF DESCRIPTION OF THE DRAWINGS

FIG. 2 depicts a diagram illustrating examples of schema;

DETAILED DESCRIPTION

Figure 1:
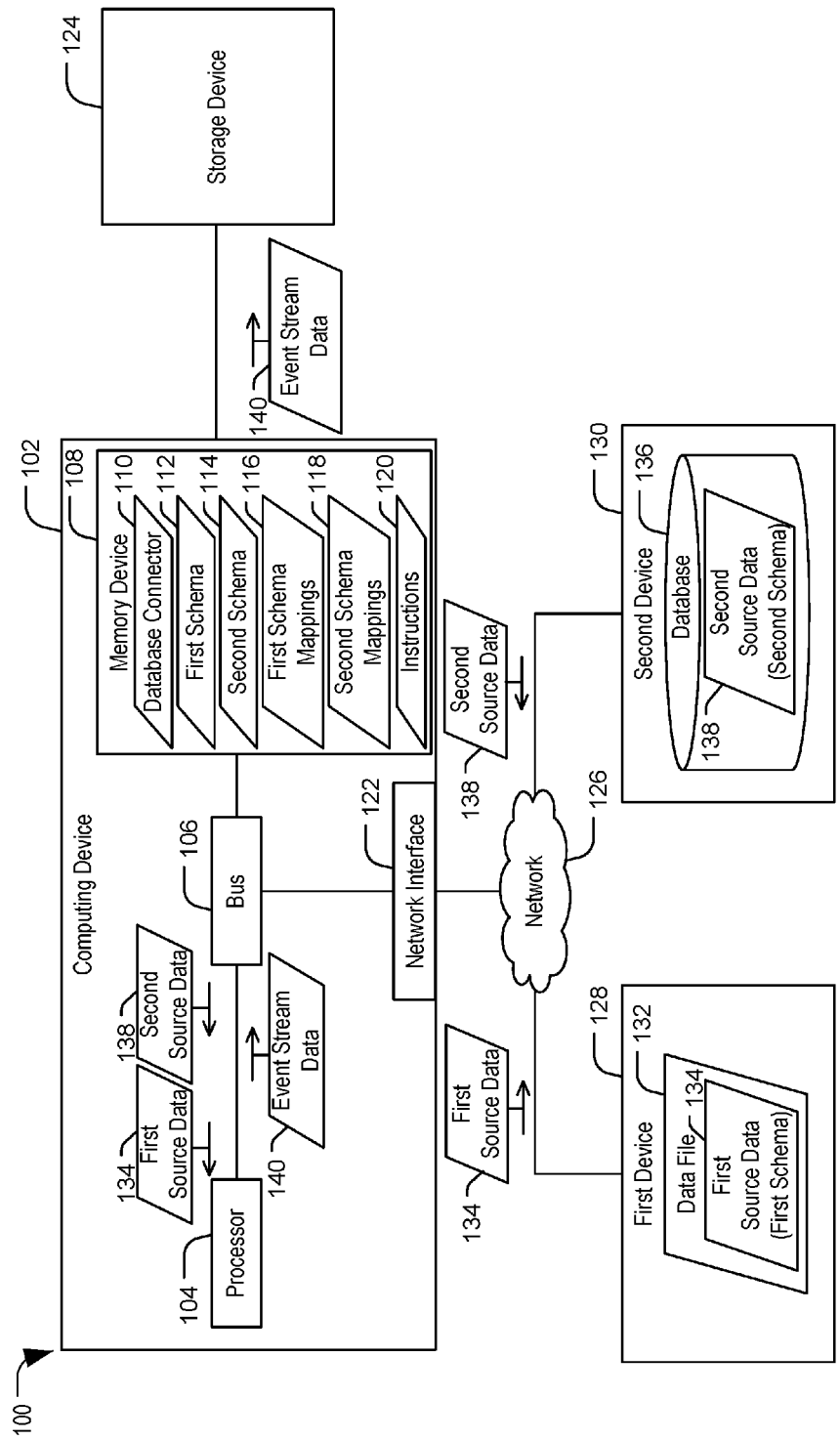
FIG. 1 depicts a diagram of a system for generating event stream data.

The techniques of the present disclosure enable loading source data represented according to different schemas. The source data may be used to generate an event stream. In some examples, the event stream data utilizes a subject-event data model rather than simply rows/columns. A "subject" may be something that exists over some length of time. Subjects can be people (e.g., employees, hospital patients, social media followers, etc.), locations (e.g., hospitals, factories, oil rigs, etc.) or other concepts (e.g., requisitions, sales opportunities, software bugs, etc.). A particular instance of a subject may be called a "subject instance." To illustrate, a specific employee (e.g., Bob) may be a subject instance of the "Employee" subject. Subject instances may each have a unique subject identifier.

Subject instances may be represented as a series of "profiles," where each profile is valid for a particular time period and is a complete representation of the subject instance for that time period. To illustrate, if Bob is hired on January 1st as an "engineer" and no changes to Bob's employee records occur until Bob is promoted to "manager" June 1st, then the subject instance for Bob may have a first profile with the attributes "name=Bob; role=engineer" that is valid from January 1st to June 1st, and a second profile with the attributes "name=Bob; role=manager" that is valid for a time period starting on June 1st. In the foregoing illustration, Bob's hiring and promotion are examples of events that would be included in an event stream. Thus, the event stream for a subject may be a mapping from a set of subject IDs to chronologically ordered sequences of events. Various types of events may be represented event streams. Examples of events include profile events (e.g., a change to a subject profile, such as profile conception, profile termination, or a change in a profile attribute) and regular events (e.g., something "happening" to a subject instance, such as salary disbursements on pay days).

As further described herein, event stream data may be generated based on source data received from one or more data sources. A data source may be any source of data that provides data structured according to a schema. Examples of data sources include data files (e.g., comma separated values files, tab separated values files, etc.), database connectors, and in-memory tables. Systems and methods that operate according to the present disclosure may receive first source data structured according to a first schema from a first data source and second source data structured according to a second schema from a second data source.

The systems and methods may generate event stream data based on the first source data and the second source data even though the first schema and the second schema are different. For example, the disclosed systems and methods may generate first normalized data based on the first source data and second normalized data based on the second source data. For example, the first normalized data may correspond to a first table structured according to a normalized schema and the second normalized data may correspond to a second table structured according to the (same) normalized schema. The systems and methods may determine first event stream data based on the first normalized data and second event stream data based on the second normalized data. The systems and methods may combine the first event stream data and the second event stream data to generate the event stream data, which may then be provided as input to an analytics application. Thus, the event stream data may be generated based on source data structured according to different schemas, and may enable inputting data from various data sources into an analytics application.

In some examples, the disclosed systems and methods may store the event stream data in a storage device. The disclosed systems and methods may also enable modification of the event stream data based on corrections data without altering the first data source or the second data source. To illustrate, corrections may be implemented as a non-destructive "corrections overlay" that does not directly change source data, but rather stores corrections separately from the source data in a manner that enables corrections to be reused if needed. In some examples, the corrections data is based on input (e.g., user input) received in response to output of a display generated based on the event stream data to a display device. Modifying the event stream data rather than the first data source and the second data source may enable faster correction of the event stream data as compared to modifying the first event source and the second event source. In some examples, the input may be received from a dynamically updated application that modifies the event stream data and automatically updates the display based on the modified event stream data.

In particular examples, the disclosed systems and methods may generate adjusted event stream data based on the modified event stream data and rules data. The rules data may represent one or more rules. To illustrate, the rules data may represent a per-subject rule, a filter rule, a mapping rule, a multi-subject rule or another type of rule. Further examples of rules are given below. Applying rules to a schema-agnostic event stream rather than to data or data structures that are schema-specific may enable reuse of the rules even though source/target schemas change. To illustrate, rules may reference subject instance identifiers, regular events, and profile events rather than relying on the presence of specific column headers and a specific number of data source tables. Rules may thus be generally applicable across multiple enterprises that have different numbers/formats of data sources.

It is to be understood that although various aspects may be described herein with reference to employee, workforce, and/or human resources data, this is for illustration only and not to be limiting. The techniques of the present disclosure may be applicable for generating event stream data corresponding to any data environment.

Referring to FIG. 1, a diagram of a system 100 for generating event stream data is illustrated. The system 100 includes a computing device 102. The computing device 102 may include a server computer, a personal computer, or any other computing device. The computing device 102 includes a processor 104, such as a central processing unit (CPU) or other processor. In some examples, the processor 104 may correspond to a group of processors. The processor 104 is communicatively coupled to a bus 106. The bus 106 may correspond to one bus or to a plurality of buses and may include a serial bus, a parallel bus, or a combination thereof. The computing device 102 further includes a memory device 108 and a network interface 122 communicatively coupled to the bus 106. In alternative examples, the computing device 102 may not include the bus 106 and the processor 104, the memory device 108, and the network interface 122 may communicate via alternative means.

The memory device 108 may correspond to one or more memory devices and may include random access memory (RAM), such as static RAM (SRAM), dynamic RAM (DRAM), or any other type of RAM; read only memory (ROM), such as programmable ROM (PROM), erasable PROM (EPROM), electrically erasable PROM (EEPROM), optical storage media, or any other type of ROM; another type of computer memory; or a combination thereof. The network interface 126 may correspond to one or more network interfaces and may include a wired interface, a wireless interface, or a combination thereof. Examples of network interfaces include network interface controllers and modems. In some examples, the computing device 102 may not include the network interface 122.

In the illustrated example, the memory device 108 stores a database connector 110. The database connector 110 may correspond to instructions that are executable to enable the processor 104 to communicate with a database. The memory device 108 further stores a first schema 112. The first schema 112 may indicate field names, field ordering, and field data types for data. The memory device 108 further stores a second schema 114. The second schema 114 may indicate field names, field ordering, and field data types for data. In some examples, the schemas 112, 114 may also indicate whether data represented in accordance with such schemas are in snapshot format (e.g., all data at a particular point in time), delta format (e.g., only data changes with respect to a previous snapshot), or in some other format. The memory device 108 further stores first schema mappings 116 and second schema mappings 118. The first schema mappings 116 may map the first schema 112 to an intermediate schema. Similarly, the second schema mappings 118 may map the second schema 114 to the intermediate schema. The memory device 108 may further store instructions 120. The instructions 120 may be executable by the processor 104 to perform one or more of the operations and methods described herein.

The computing device 102 is coupled to a storage device 124 (e.g., a computer-readable storage device). The storage device 124 may include a hard disk drive, a solid state drive, a memory cache, or some other type of storage device. While illustrated external to the computing device 102, the storage device 124 may be included with the computing device 102 in other examples. Further, while the storage device 124 is illustrated directly coupled to the computing device 102, in other examples, the storage device 124 may be communicatively coupled to the computing device via the network interface 122.

The network interface 122 may be communicatively coupled to a network 126. The network 126 may correspond to one or more networks including a wired network, a wireless network, or a combination thereof. In some examples, the network 126 includes components that function according to an Ethernet protocol, an institute of electrical and electronics engineers 802.11 protocol, a long term evolution (LTE) protocol, another communication protocol, or a combination thereof.

In the illustrated example, a first device 128 and a second device 130 are communicatively coupled to the network 126. The first device 128 and the second device 130 may include any type of computing device. The first device 128 stores a data file 132 (e.g., a first data source) that includes first source data 134. The second device 130 stores a database 136 (e.g., a second data source) that includes second source data 138. In alternate examples, the first source data 134 and the second source data 138 may be stored in different data sources and/or at different devices. In some examples, the computing device 102 is associated with an analytics application and the first device 128 is associated with a data provider, customer, or client of a provider of the analytics application. In some examples, one or both of the first source data 134 and the second source data 138 is stored at the computing device 102 (e.g., in the memory device 108 or the storage device 124). For example, the data file 132 (or a different data source including the first data 134) and/or the database 136 (or a different data source including the second data 138) may be stored at the computing device 102. Examples of data sources include, but are not limited to, delimited files (e.g., a comma-separated values file, a tab-separated values file, etc.), database connectors (e.g., a Java Database Connectivity connector, an Open Database Connectivity connector, etc.), and/or in-memory tables.

In operation, the processor 104 may receive the first source data 134 and the second source data 138. In the illustrated example, the processor 104 receives the first source data 134 from (or in the form of) the data file 132 stored at the first device 128. In some examples, the data file 132 may be transmitted from the first device 128 to the computing device 102 via the network 126. In some examples, the first device 128 may transmit the first source data 134 to the computing device 102 in response to a request generated by the processor 104 and transmitted to the first device 128 via the bus 106, the network interface 122, and the network 126. The request may be generated by the processor 104 based on a schedule. For example, the processor 104 may request data from the first device 128 once every day. The schedule may be stored in the instructions 120. Alternatively, the first device 128 may push the first source data 134 to the computing device 102, such as periodically or in response to user input at the first device 128.

In the illustrated example, the processor 104 receives the second data 138 from the database 136 stored at the second device 130. For example, the processor 104 may receive the second source data 138 through the database connector 110 executing at the processor 104. In some examples, the second device 130 may transmit the second source data 138 to the computing device 102 in response to a request generated by the processor 104 and transmitted to the second device 130 via the bus 106, the network interface 122, and the network 126. The request may be generated based on the database connector 110 executing at the processor 104. To illustrate the database connector 110 may enable the processor 104 to connect to and to communicate with the database 136. Further, the request may be generated by the processor 104 based on a schedule. For example, the processor 104 may request data from the second device 130 once every day. The schedule may be stored in the instructions 120. Alternatively, the second device 130 may push the second source data 138 to the computing device 102, such as periodically or in response to user input at the second device 130.

As further described herein, the processor 104 may generate event stream data 140 based on the first source data 134 and the second source data 138 such that the event stream data 140 represents at least a first event extracted from the first source data 134 and a second event extracted from the second source data 138. In some examples, the processor 104 may transmit the event stream data 140 to the storage device 124 for storage (e.g., in a compressed comma separated values (CSV) format or in another format). While illustrated as generated based on two sets of data (e.g., the first source data 134 and the second source data 138), the event stream data 140 may be generated based on any number of data sets greater than one. The data sets may correspond to any number of schema.

In some examples, as further described herein, the event stream data 140 may be used to generate profile data that is compatible with consumer(s) of such data. To illustrate, the event stream data 140 may include numerous events, where each such event is associated with a change (e.g., hiring, firing, payroll, promotion, etc.) to an instance (e.g., John Smith) of a subject (e.g., employee). The system 100 may include one or more applications that are configured to process event data according to a subject-event representation in which each subject instance has a profile indicating a chronology of changes to that subject instance. In this example, the event stream data 140 may be used to generate such profile data that is consumable by various applications at the system 100. In some examples the event stream data 140 may be subjected to correction and/or rule-based validation operations prior to generation of the profile data, as further described herein.

Thus, the system 100 may generate event stream data based on source data structured according to different schemas. Accordingly, analytics software that utilizes event stream data as input may be used to analyze various data sets structured according to any number of different schema. Therefore, the system 100 may enable a data analytics system to analyze data from more sources than previously possible resulting in more accurate analytics information. Further the system 100 may enable greater flexibility in data storage, as the system 100 may enable an analytics application to analyze information from data sources structured according to schema not (e.g., natively) supported by the analytics application. In some examples, additional operations may be performed on the event stream data to output data according to a schema that is consumable by an analytics application, as further described herein.

Moreover, it will be appreciated that the system 100 and the techniques of the present disclosure may enable multiple additional technological benefits. For example, the system 100 may enable the analytics application to access data previously inaccessible to the analytics application. Thus, the system 100 may enable more complete analytics to be performed. As another example, automatically storing the event stream data 140 separately from the first source data 134 and the second source data 136 may enable one or more operations to be performed on the event stream data 140 without destructive operation on the first source data 134 and the second source data 136, as described further below. Thus, the system 100 may enable greater retention of source data, such as for auditing purposes.

Referring to FIG. 2, a diagram 200 illustrating particular examples of the first schema 112 and the second schema 114 are shown. As illustrated in FIG. 2, data structured according to the first schema 112 includes six fields (e.g., data columns). The first schema 112 indicates a name, a data type, and an ordering of each of the six fields. Further, the first schema 112 indicates documentation (e.g., developer comments) for each of the fields. To illustrate, a first field of the six fields is named "ID_col" and has a data type of "long" (e.g., a long integer). Documentation of the first field of the six fields indicates that the first field is an Employee Identifier. Data structured according to the first schema 112 may have six columns corresponding to the six fields illustrated in FIG. 1. Each entry (e.g., row) in the data may have a corresponding value in each of the six fields. To illustrate, a particular entry (e.g., row) of data structured according to the first schema 112 may include "1, 1969-07-21 T 02:56 UTC, Manager, John Smith, 123 Cherry Street, Austin Tex.," where each field (e.g., column) is delimited by a comma. In alternate examples, data structured according to the first schema 112 may be delimited by markers other than commas. Further, it is to be understood that the diagram 200 illustrates one example of the first schema 112. The first schema 112 may correspond to any schema and may include any data.

In the illustrated example, the second schema 114 includes five fields and indicates a name, a data type, and an ordering of each of the five fields. An example of a particular entry (e.g., row) of data structured according to the second schema may include "1969-07-21 T 02:56 UTC, 1, John Smith, 123 Cherry Street Austin Tex., Manager," where each field (e.g., column) is delimited by a comma. Data structured according to the second schema 114 may be delimited by markers other than commas. Further, it is to be understood that the diagram 200 illustrates one example of the second schema 114. The second schema 114 may correspond to any schema and may include any data.

Figure 3:
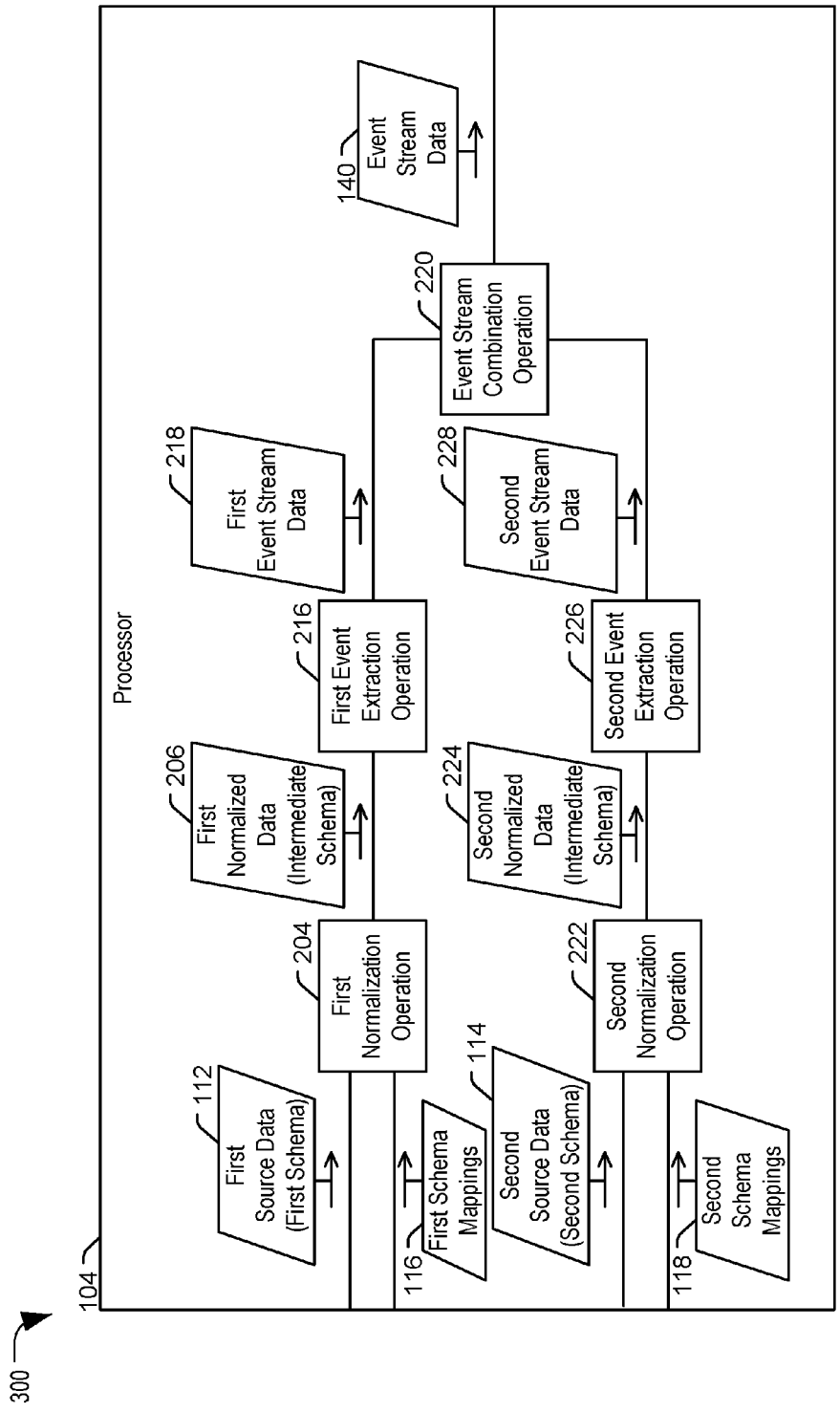
FIG. 3 depicts a diagram illustrating a flow of data within a processor during generation of event stream data.

Referring to FIG. 3, a diagram 300 illustrating a flow of data within the processor 104 during generation of the event stream data 140 is shown. As illustrated, the processor 104 may receive the first source data 134 (e.g., from the data file 132 of the first device 128) and the first schema mappings 116 (e.g., from the memory device 108). As further described with reference to FIG. 4, the processor 104 may perform a first normalization operation 204 on the first source data 134 using the first schema mappings 116 to generate first normalized data 206. As further explained with reference to FIGS. 8-9, in some examples the processor 104 may perform a first event extraction operation 216 on the first normalized data 206 to generate first event stream data 218.

In addition, the processor 104 may receive the second source data 138 (e.g., from the database 136 of the second device 130) and the second schema mappings 118 (e.g., from the memory device 108). As further described with reference to FIG. 5, in some examples the processor 104 may perform a second normalization operation 222 on the second source data 138 using the second schema mappings 118 to generate second normalized data 224. As further explained with reference to FIGS. 8-9, the processor 104 may perform a second event extraction operation 226 on the second normalized data 224 to generate second event stream data 228. As further explained with reference to FIG. 10, the processor may perform an event stream combination operation 220 on the first event stream data 218 and the second event stream data 228 to generate the event stream data 140.

Figure 4:
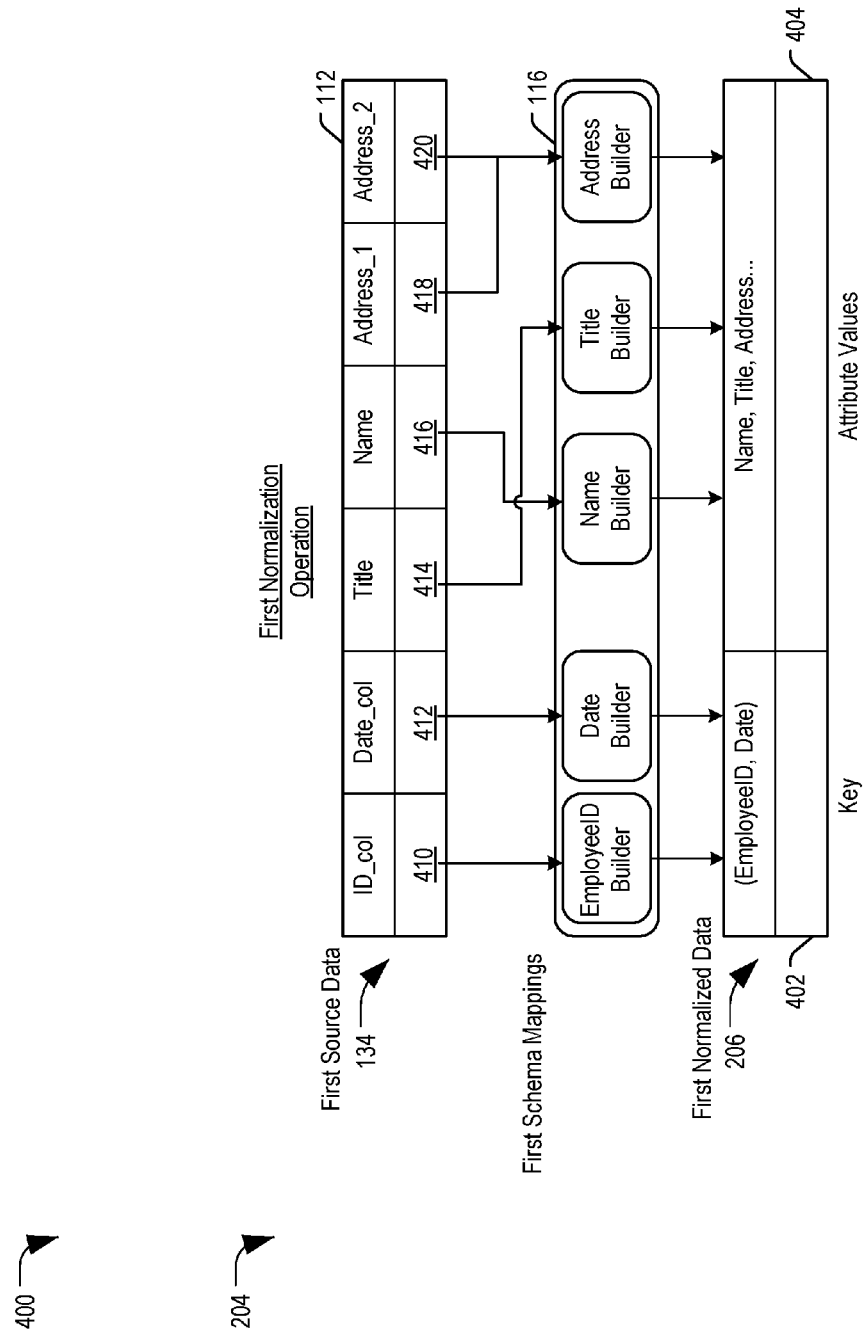
FIG. 4 depicts a diagram of a normalization operation.

Referring to FIG. 4, a diagram 400 of the first normalization operation 204 is shown. FIG. 4 illustrates a representation of the first source data 134 as a table having columns defined by the first schema 112 as illustrated in FIG. 2. As explained above, the first source data 134 may include information related to a subject (alternately referred to herein as a "category"). In the example illustrated in FIG. 4, the subject is Employee. Thus, each entry (e.g., row) of the first source data 134 may include information related to a particular employee at a particular time. In the illustrated example, an ID_col field (e.g., column) of a first entry of the first source data 134 has a first value 410. A Date_col field of the first entry has a second value 412. A Title field of the first entry has a third value 414. A Name field of the first entry has a fourth value 416. An Address_1 field of the first entry has a fifth value 418. An Address_2 field of the first entry has a sixth value 420.

As illustrated in FIG. 4, data from the first entry (e.g., row) of the first source data 134 may be mapped by the first schema mappings 116 to fields (e.g., columns) of a second entry (e.g., a second row) of the first normalized data 206. The first schema mappings 116 may include a plurality of "builders." Each builder may map a field of the first schema 112 to a field of an intermediate schema that the first normalized data 206 is structured based on. In some examples, each builder may correspond to executable code that extracts a value from the first source data 134 and populates a corresponding field of the first normalized data 206 with the value. It will be appreciated that when a source schema changes, such changes may be accommodated by modifying the relevant builders without having to modify any downstream components of the system 100. In some examples, builders and normalizers (which are further described below) may be versioned in step with source schemas. Builders may be defined by an owner of the first source data 134 and/or by a provider of an analytics application. In some examples, builders may be defined using a graphical user interface (GUI) that enables a user to "draw" connections between a data fields of the first source data 134 and data fields of the first normalized data 206.

Each entry of the first normalized data 206 may be uniquely identified by a corresponding key. In the illustrated example, each key corresponds to a subject identifier and a timestamp, and is thus based on multiple data fields of the first source data 134. The subject identifier uniquely identifies a subject instance. Subjects, subject instances, and subject identifiers are described in more detail below with reference to FIG. 6. In the illustrated example, each key includes a tuple that contains an employee identifier (e.g., a subject identifier for the employee subject) and a date pair. The employee identifier corresponds to an EmployeeID field and the date corresponds to a Date field. Each entry of the first normalized data 206 may further include attribute values associated with a corresponding key. Thus, each entry of the first normalized data 206 may identify attributes of a particular subject instance at a particular time. In the illustrated example, the attribute values include at least a name, a title, and an address. The name corresponds to a Name field, the title corresponds to a Title field, and the address corresponds to an Address field.

In some circumstances, the first source data 134 may include data recorded on more than one date. For example, the first source data 134 may include first data recorded on a first date and second data recorded on a second date. To illustrate, the first data may have been recorded on Jul. 1, 2000 and the second data may have been recorded on Aug. 1, 2000. The first data and the second data may include information related to overlapping time periods. For example, the first data may record information from Jun. 1, 2000 to Jul. 1, 2000 and the second data may record information from Jun. 1, 2000 to Aug. 1, 2000. Accordingly, entries with the same identifier and timestamp combination may occur in different data loads. Thus, it may be possible for the first source data 134 to include conflicting entries for the same subject instance. Resolution of such conflicting entries is described below with reference to FIG. 7.

In the illustrated example, an EmployeeID Builder of the first schema mappings 116 maps the first value 410 to a first value of the EmployeeID field of the second entry of the first normalized data 206. Similarly, a Date Builder of the first schema mappings 116 maps the second value 412 to a second value of the Date field of the second entry. The first value 410 of the EmployeeID field and the second value 412 of the Date field of the first normalized data 206 form a key 402 that uniquely identifies the second entry (e.g., row) of the first normalized data 206. Further, a Name Builder of the first schema mappings 116 maps the fourth value 416 to the Name field of the second entry. A Title Builder of the first schema mappings 116 maps the third value 414 to the Title field of the second entry, and an Address builder maps the fifth value 418 and the sixth value 420 to the Address field of the second entry. The fourth value 416 of the Name field, the third value 414 of the Title field, and the combined fifth value and sixth value of the Address field form attributes values 404 associated with the key 402.

Figure 5:
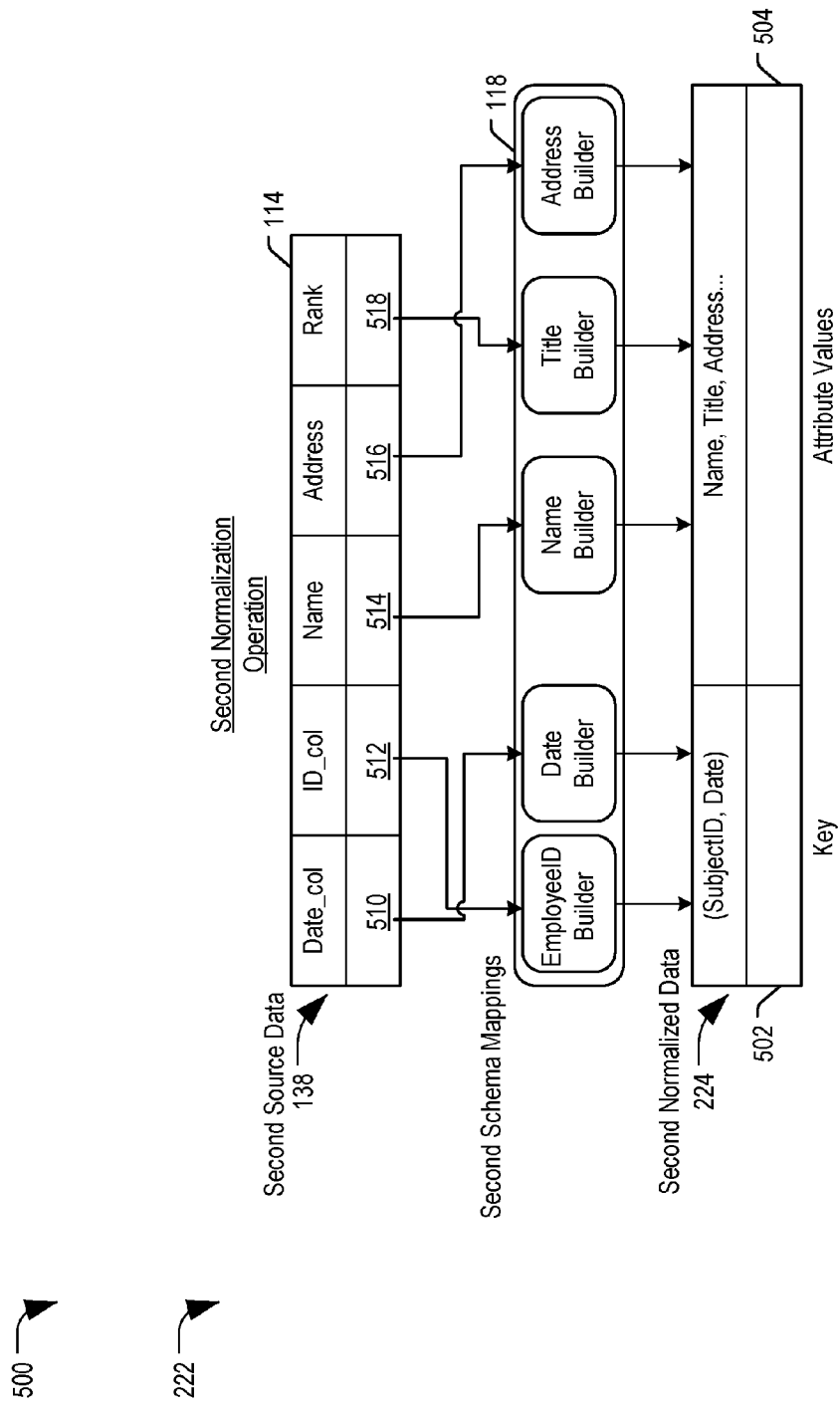
FIG. 5 depicts a diagram of another normalization operation.

Referring to FIG. 5, a diagram 500 of the second normalization operation 222 is shown. FIG. 5 illustrates a representation of the second source data 138 as a table having columns defined by the second schema 114, as illustrated in FIG. 2. As explained above, the second source data 138 may include information related to a subject. In the example illustrated in FIG. 5, the subject is Employees. Thus, each entry (e.g., row) of the second source data 138 may include information related to a particular employee at a particular time. In the illustrated example, a Date_col field (e.g., column) of a first entry of the second source data 138 has a first value 510. An ID_col field of the first entry of the second source data 138 has a second value 512. A Name field of the first entry of the second source data 138 has a third value 514. An Address field of the first entry of the second source data 138 has a fourth value 516. A Rank field of the first entry of the second source data 138 has a fifth value 518.

As illustrated in FIG. 5, data from the first entry (e.g., row) of the second source data 138 is mapped by the second schema mappings 118 to fields (e.g., columns) of a second entry (e.g., a row) of the second normalized data 224. The second schema mappings 118 may include a plurality of builders. Each builder may map a field of the second schema 114 to a field of the intermediate schema that the second normalized data 224 is structured based on. In some examples, each builder may correspond to executable code that extracts a value from the second source data 138 and populates a corresponding field of the second normalized data 224 with the value. In some examples, the first schema mappings 116 and the second schema mappings 118 correspond to the same executable code.

In the illustrated example, an EmployeeID Builder of the second schema mappings 118 maps the second value 520 to a first value of the EmployeeID field of the second entry of the second normalized data 224. Similarly, a Date Builder of the second schema mappings 118 maps the first value 510 to a second value of the Date field of the second entry of the second normalized data 224. The second value 512 of the EmployeeID field and the first value 510 of the Date field of the second normalized data 224 form a key 502 that uniquely identifies the second entry (e.g., row) of the second normalized data 224. Further, a Name Builder of the second schema mappings 118 maps the third value 514 to the Name field of the second entry of the second normalized data 224. A Title Builder of the second schema mappings 118 maps the fifth value 518 to the Title field of the second entry of the second normalized data 224, and an Address builder maps the fourth value 516 to the Address field of the second entry of the second normalized data 224. The third value 514 of the Name field, the fifth value 518 of the Title field, and the fourth value 516 of the Address field form attributes values 404 associated with the key 402.

As illustrated in FIGS. 4 and 5, the first normalized data 206 and the second normalized data 224 may be structured according to a common "intermediate" schema. In some examples, the intermediate schema may comply with a data model that is compatible with an analytics application. For example, it will be appreciated that the intermediate schema shown in FIGS. 4 and 5 converts source data into a subject-event data representation, where each entry of the normalized data corresponds to an event occurring with respect to a particular subject instance at a particular point in time. In some examples, data represented in accordance with the intermediate schema may be sorted (e.g., chronologically by date). FIGS. 4 and 5 thus show converting source data into an intermediate representation suitable for event extraction. Attribute values for each subject instance at various dates and events occurring with respect to each subject instance may be represented in the intermediate representation.

Figure 6:
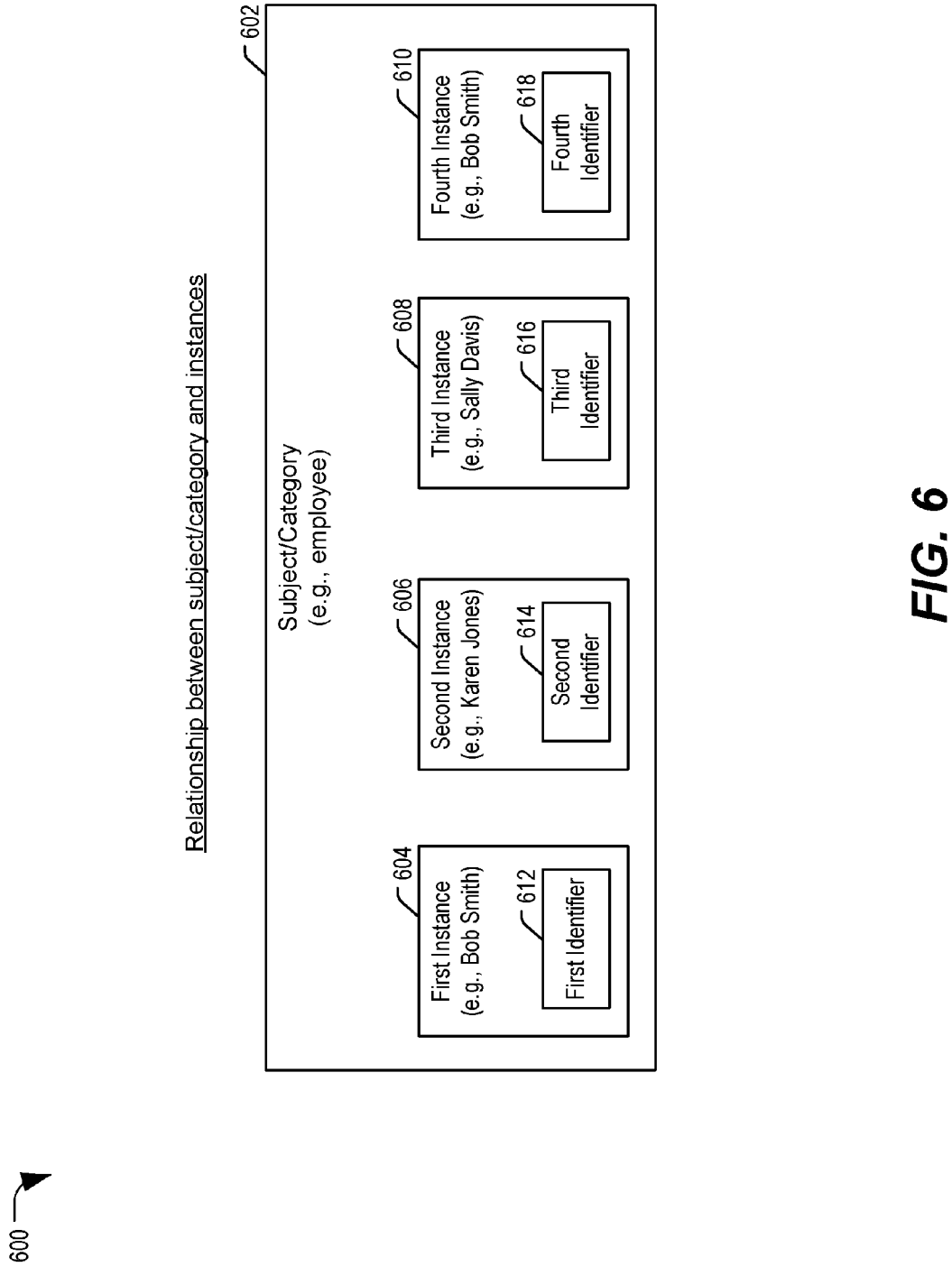
FIG. 6 depicts a diagram illustrating a relationship between a subject and subject instances.

Referring to FIG. 6, a diagram 600 illustrating a relationship between a subject and subject instances is shown. As explained above, data, such as the first source data 134 and the second source data 138, may include information related to a subject. The diagram 600 depicts an Employee subject 602.

Data that includes information related to a subject may include information related to one or more instances of a subject. An instance of a subject is a unique instantiation of a subject (e.g., a member of the set). To illustrate, an instance of a business subject may be Chemical Corporation, an instance of a building subject may be Chemical Corporation Tower, and an instance of an inventory item may be a container of chemical x. In the example of FIG. 6, the subject 602 includes a first instance 604 (e.g., Bob Smith), a second instance 606 (e.g., Karen Jones), a third instance 608 (e.g., Sally Davis), and a fourth instance 610 (e.g., another person named Bob Smith).

As illustrated in FIG. 6, two different instances of a subject may have the same value for a particular attribute. For example, the employee corresponding to the first instance 604 and the employee corresponding to the fourth instance 610 have the same name (e.g., Bob Smith). Each subject instance is uniquely identified by a subject identifier. A subject identifier may correspond to an alphanumeric string, an integer, to floating point number, or another type of data that may be used for identification. To illustrate, the employees of the subject 602 may be uniquely identified by employee identifiers (e.g., social security numbers or other uniquely assigned identifiers). Data associated with a particular subject instance includes an attribute value corresponding to the subject identifier of the particular subject instance. In the illustrated example, the first instance 604 includes a first identifier 612, the second instance 606 includes a second identifier 614, the third instance 608 includes a third identifier 616, and the fourth instance 610 includes a fourth identifier 618.

Figure 7:
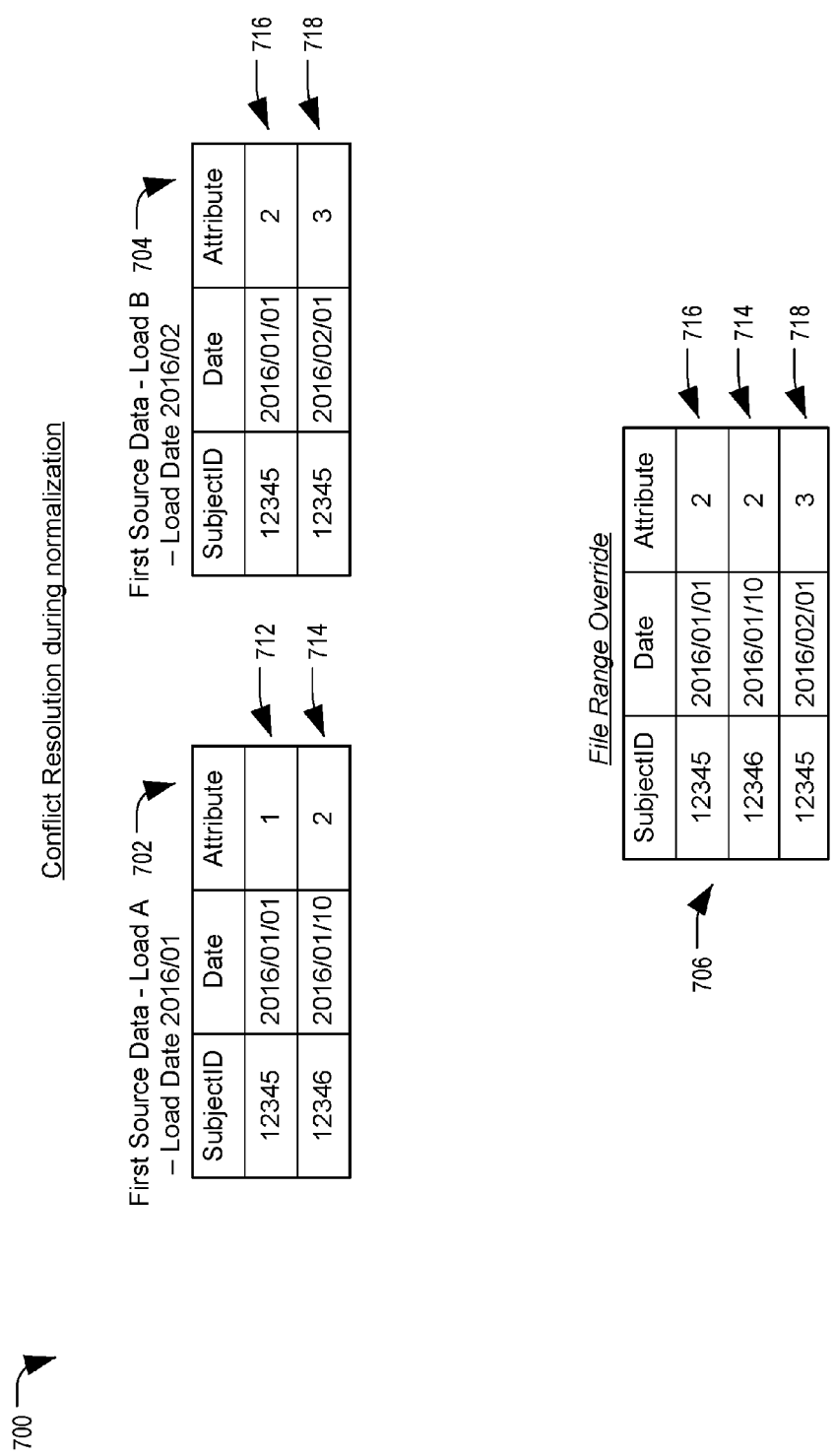
FIG. 7 depicts a diagram illustrating conflict resolution during normalization.

Referring to FIG. 7, a diagram 700 illustrating conflict resolution during normalization (e.g., the first normalization operation 204 or the second normalization operation 222). As explained above, data (e.g., the first source data 134 or the second source data 138) may include data recorded on more than one date. For example, the first source data 134 may be received by the computing device 102 as a series of data loads over a period of time. In the illustrated example, a Load A 702 of the first source data 134 is received in January 2016 and a Load B 704 of the first source data 134 is received in February 2016.

The Load A 702 includes a first entry 712 and a second entry 714. The first entry 712 indicates that a subject instance with an identifier of "12345" had an attribute value of "1" on 2016 Jan. 1. The second entry 714 indicates that a subject instance with an identifier of "12346" had an attribute value of "2" on 2016 Jan. 10. The Load B 704 includes a third entry 716 and a fourth entry 718. The third entry 716 indicates that the subject instance with the identifier of "12345" had an attribute value of "2" on 2016 Jan. 1. The fourth entry indicates that the subject instance with the identifier of "12345" had an attribute value of "3" on 2016 Feb. 1. The first entry 712 and the third entry 716 are in conflict because they indicate that the same subject instance "12345" has different attribute values (e.g., "1" and "2") at the same time (e.g., 2016 Jan. 1).

The described systems and methods may enable multiple methods of conflict resolution. In illustrative examples, the conflict resolution technique that is used may be determined based on user input (e.g., at the system 100) or may be selected automatically. According to a file range override conflict resolution technique, for each timestamped period across all data loads, only rows originating from the most recent data load for that timestamped period may be kept. The file range override conflict resolution technique may thus result in rows with a particular timestamp originating from the same data load. For example, as shown in FIG. 7, output data 706 resulting from the file range override conflict resolution technique may include the entries 714, 716, and 718 but not the entry 712, because the entry 712 is overwritten by the entry 716, which has the same 2016 Jan. 1 date as the entry 712. However, the entry 714 is not overwritten because no newer data load has an entry with the same 2016 Jan. 10 date as the entry 714. The processor 104 may generate the first normalized data 206 based on the output data 706.

Various other conflict resolution techniques may also be available. According to a subject override conflict resolution technique, conflicts between rows may be resolved by accepting rows from all data loads. If two rows have the same key (i.e., both the SubjectID and the timestamp match), then the row originating from the most recent data load is accepted while rows from older data loads are discarded. This may enable data loads to make corrections to data from older data loads.

According to an event date subject override conflict resolution technique, conflicts may be resolved according to the subject override conflict resolution technique, except that event dates themselves may also be overridden. According to an event date override conflict resolution technique, only records having a most recent table timestamp (e.g., data load date) may be accepted for each time period. It should be understood that the various conflict resolution techniques described herein are for example only and are not to be considered limiting. Different conflict resolution techniques may be used in alternative aspects.

Figure 8:
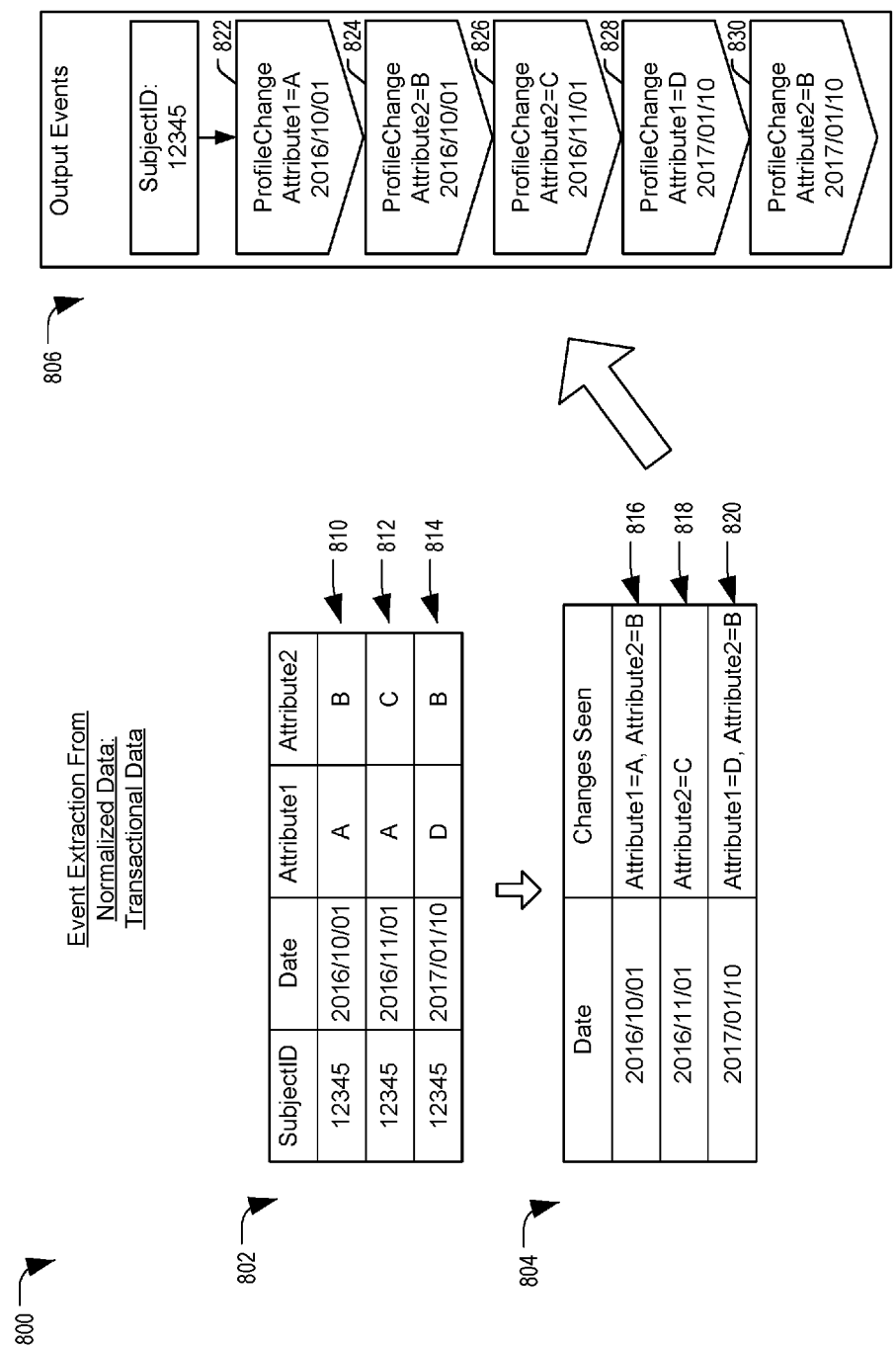
FIG. 8 depicts a diagram of normalized transactional data.
Figure 9:
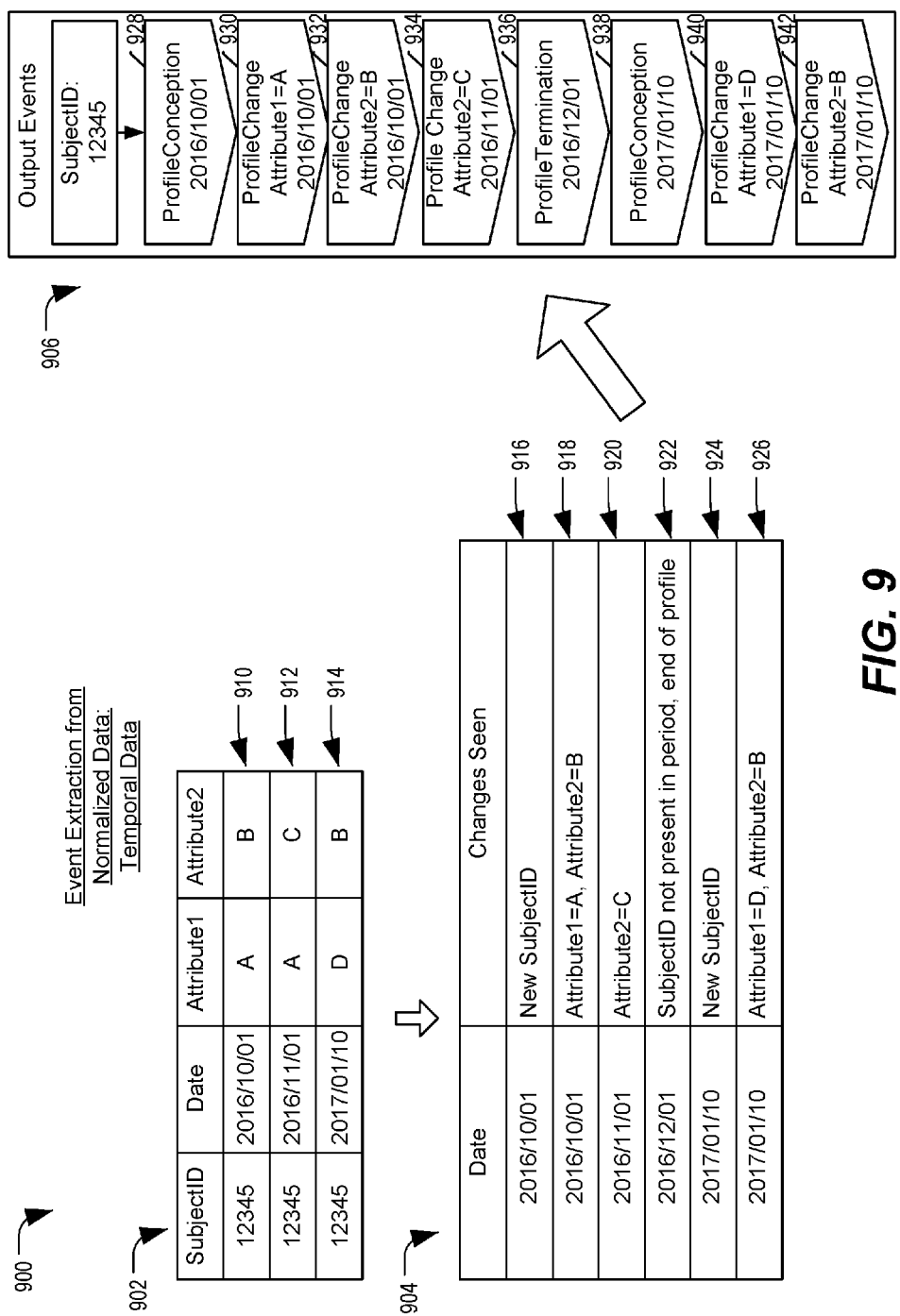
FIG. 9 depicts a diagram of normalized temporal data.

FIGS. 8 and 9 show diagrams illustrating event extraction operations. The event extraction operations of FIGS. 8 and 9 may be examples of the first event extraction operation 216 or the second event extraction operation 226. FIG. 8 depicts a diagram 800 illustrating generation of event stream data from normalized transactional data, and FIG. 9 depicts a diagram 900 illustrating generation of event stream data from normalized temporal data. The first source data 134 and the second source data 138 may include transactional data and/or temporal data. Accordingly, the first normalized data 206 and the second normalized data 224 may include normalized transactional data and/or normalized temporal data.

Transactional data may include information that indicates how subject instances change over time. When information regarding a subject instance is not included in transactional data for a particular time period, the processor 104 may determine that the particular subject instance did not change during the particular time period. An illustrative non-limiting example of transactional data includes a list of changes made to documents. If transactional data for a particular time period does not include information related to a particular document, the processor 104 may determine that the particular document was not changed during the particular time period rather than that the particular document did not exist during the time period.

Temporal data (e.g., "snapshot data") may include information for each valid subject instance of a subject for a given time period. When information regarding a subject instance is not included in temporal data for a particular time period, the processor 104 may determine that the particular subject instance has no valid profile during that time period. An example, of temporal data includes monthly snapshots of current states of a company's employees. If temporal data for a particular month does not include information related to a person previously determined to be an employee, the processor 104 may determine that the person was not an employee during that particular month (e.g., the person may have resigned or may be an occasional contractor).

Referring to FIG. 8, the diagram 800 illustrates normalized transactional data 802. The normalized transactional data 802 may correspond to the first normalized data 206 or to the second normalized data 224. In the illustrated example, the normalized transactional data 802 includes information related to a subject instance identified by the identifier "12345." The normalized transaction data 802 includes a first entry 810, a second entry 812, and a third entry 814. The first entry 810 indicates that a value of an Attribute1 of the subject instance identified by the identifier "12345" was "A" and a value of an Attribute2 of the subject instance identified by the identifier "12345" was "B" on 2016 Oct. 1. The second entry 812 indicates that the Attribute1 value of the subject instance identified by the identifier "12345" was "A" and the Attribute2 value of the subject instance identified by the identifier "12345" was "C" on 2016 Nov. 1. The third entry 814 indicates that the Attribute1 value of the subject instance identified by the identifier "12345" was "D" and the Attribute2 value of the subject instance identified by the identifier "12345" was "B" on 2017 Jan. 10.

Based on the normalized transaction data 802, the processor 104 may detect transactional changes 804. For example, the processor 104 may detect a first change 816, a second change 818, and a third change 820. The first change 816 indicates that Attribute1 changed to "A" and Attribute2 changed to "B" on 2016 Oct. 1. The second change 818 indicates that Attribute2 changed to "C" on 2016 Nov. 1. The third change 820 indicates that Attribute1 changed to "D" and Attribute2 changed to "B" on 2017 Jan. 10.

Based on the transactional changes 804, the processor 104 may generate event stream data 806. The event stream data 806 may correspond to the first event stream data 218 or to the second event stream data 228. The event stream data 806 may include information indicating one or more events. To illustrate, the processor 104 may include a first event 822 and a second event 824 in the event stream data 806 based on the first change 816. Further, the processor 104 may include a third event 826 in the event stream data 806 based on the second change 818. Further, the processor 104 may include a fourth event 828 and a fifth event 830 in the event stream data 806 based on the third change 820.

Referring to FIG. 9, the diagram 900 illustrates normalized temporal data 902. The normalized temporal data 902 may correspond to the first normalized data 206 or to the second normalized data 224. In the illustrated example, the normalized temporal data 902 includes information related to a subject instance identified by the identifier "12345." The normalized temporal data 902 includes a first entry 910, a second entry 912, and a third entry 814. The first entry 910 indicates that a value of Attribute1 of the subject instance identified by the identifier "12345" was "A" and a value of an Attribute2 of the subject instance identified by the identifier "12345" was "B" on 2016 Oct. 1. The second entry 912 indicates that the Attribute1 value of the subject instance identified by the identifier "12345" was "A" and the Attribute2 value of the subject instance identified by the identifier "12345" was "C" on 2016 Nov. 1. The third entry 914 indicates that the Attribute1 value of the subject instance identified by the identifier "12345" was "D" and the Attribute2 value of the subject instance identified by the identifier "12345" was "B" on 2017 Jan. 10.

Based on the normalized temporal data 902, the processor 104 may detect temporal changes 904. For example, the processor 104 may detect a first change 916, a second change 918, a third change 920, a fourth change 922, a fifth change 924, and a sixth change 926. The first change 916 indicates that a new subject instance has been detected, corresponding to a profile conception event. The second change 918 indicates that Attribute1 changed to "A" and the Attribute2 changed to "B" on 2016 Oct. 1. The third change 920 indicates that Attribute2 changed to "C" on 2016 Nov. 1. The fourth change 922 indicates a profile termination event for the subject instance because the normalized data 902 does not include information related to the subject instance for 2016 Dec. 1. The fifth change 924 indicates that the subject instance has been detected again, corresponding to another profile conception event. The sixth change 926 indicates that Attribute1 changed to "D," and Attribute2 changed to "B" on 2017 Jan. 10.

Based on the temporal changes 904, the processor 104 may generate event stream data 906. The event stream data 906 may correspond to the first event stream data 218 or to the second event stream data 228. The event stream data 906 may include information indicating one or more events. To illustrate, the processor 104 may include a first event 928 in the event stream data 906 based on the first change 916. The processor 104 may include a second event 930 and a third event 932 in the event stream data 906 based on the second change 918. Further, the processor 104 may include a fourth event 934 in the event stream data 906 based on the third change 920. Further, the processor 104 may include a fifth event 936 in the event stream data 906 based on the fourth change 922. Further, the processor 104 may include a sixth event 938 in the event stream data 906 based on the fifth change 924. Further, the processor 104 may include a seventh event 940 and an eighth event 942 in the event stream data 906 based on the sixth change 926.

Figure 10:
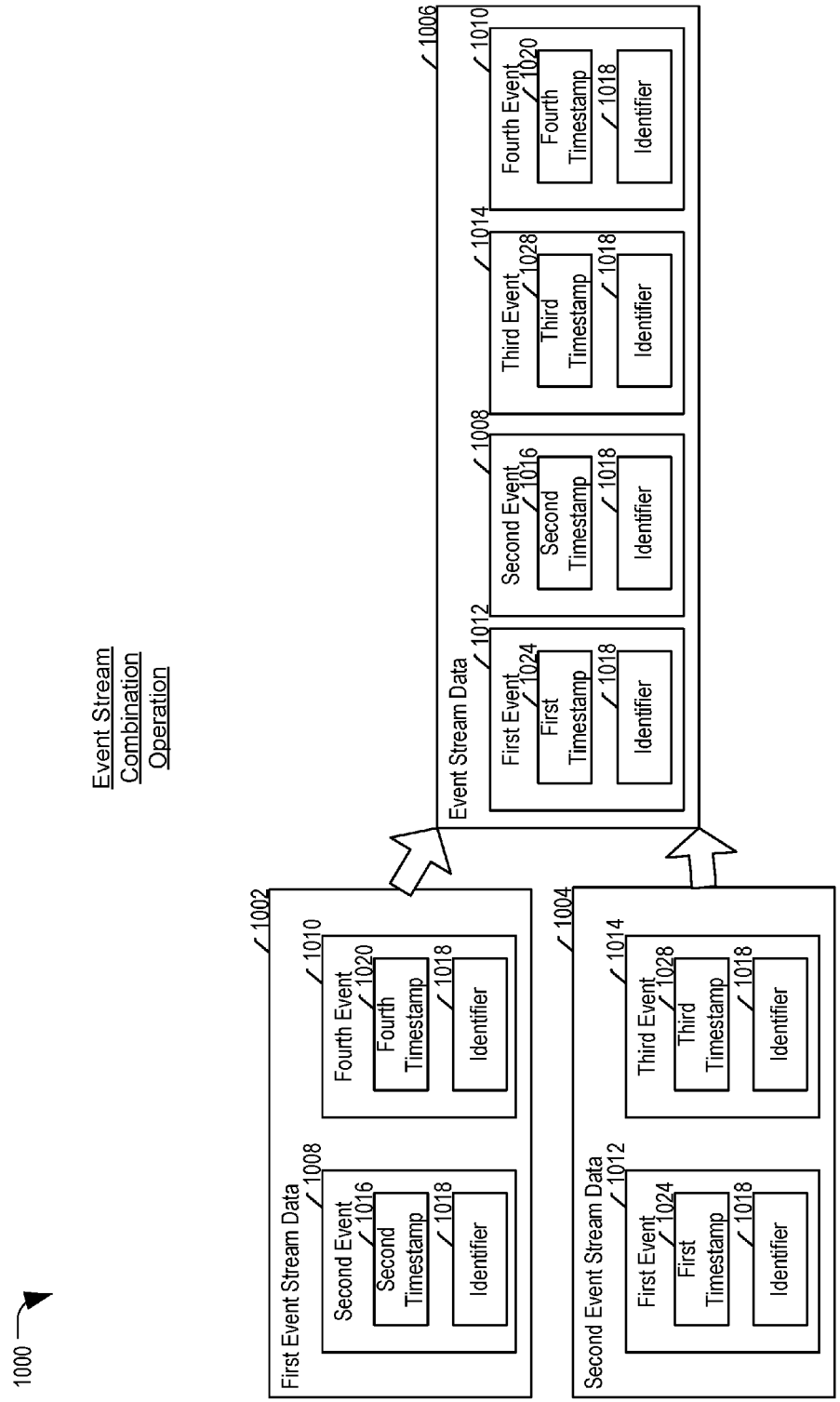
FIG. 10 depicts a diagram illustrating an example of an event stream combination operation.

Referring to FIG. 10, a diagram 1000 illustrating an example of an event stream combination operation is shown. The event stream combination operation may correspond to the event stream combination operation 220 of FIG. 2.

The diagram 1000 depicts first event stream data 1002 and second event stream data 1004. The first event stream data 1002 may correspond to the first event stream data 218 and the second event stream data 1004 may correspond to the second event stream data 228. The processor 104 may combine the first event stream data 1002 and the second event stream data 1004 to generate event stream data 1006. The event stream data 1006 may correspond to the event stream data 140. The first event stream data 1002 may include a first set of events and the second event stream data 1004 may include a second set of events. The first set of events may be sorted according to timestamps of the first set of events and the second set of events may be sorted according to timestamps of the events.

In the illustrated example, the first event stream data 1002 includes a second event 1008 and a fourth event 1010. Each of the second event 1008 and the fourth event 1010 includes an identifier 1018 indicating that the events 1008, 1010 are related to the same subject instance. The second event 1008 includes a second timestamp 1016 and the fourth event 1010 includes a fourth timestamp 1020. The second event 1008 and the fourth event 1010 are sorted within the first event stream data 1002 based on the second timestamp 1016 and the fourth timestamp 1020. The second event stream data 1004 includes a first event 1012 and a third event 1014. Each of the first event 1012 and the third event 1014 includes the identifier 1018 indicating that the events 1012, 1014 are related to the same subject instance. The first event 1012 includes a first timestamp 1024 and the third event 1014 includes a third timestamp 1028. The first event 1012 and the third event 1014 are sorted within the second event stream data 1004 based on the first timestamp 1024 and the third timestamp 1018.

The processor 104 may combine the events 1008, 1010 of the first event stream data 1002 and the events 1012, 1014 of the second event stream data 1004 based on the timestamps 1016, 1020, 1024, 1028 to generate the event stream data 1006 such that the events 1012, 1008, 1014, 1002 within the event stream data 1006 are sorted based on the timestamps 1016, 1020, 1024, 1028. While depicted as including only events related to a single subject instance, it is to be understood that the event stream data 1006 may include events related to a plurality of subject instances.

In some examples, event streams may be merged in accordance with the following pseudocode:

```
function mergeEventStreams(leftStream, rightStream):
    outputStream=EmptyEventStream
    outputStream.subjectIDs=leftStream.subjectIDs+right-
Stream.subjectIDs
    for id←outputStream.subjectIDs:
    leftEvents=leftStream.eventsForSubject(id)
    rightEvents=rightStream.eventsForSubject(id)
    outputStream.eventsForSubject(id)=mergeForID(left-
        Events, rightEvents)
    return outputStream
function mergeForID(leftEvents, rightEvents):
    if leftEvents.isEmpty:
    return rightEvents
```

```
else if rightEvents.isEmpty:
    return leftEvents
outputEvents=[ ]
while leftEvents.nonEmpty and rightEvents.nonEmpty:
    if timeOf(leftEvents.first)<=timeOf(rightEvents.first):
    outputEvents+=leftEvents.popFirst( )
    else:
    outputEvents+=rightEvents.popFirst( )
    outputEvents+=leftEvents
    outputEvents+=rightEvents
    return outputEvents
```

It may occasionally be necessary to make corrections to data that is being loaded for analysis by analytic applications. For example, corrections may be made to address incorrect data entry, missing information, or manually override particular attribute values. Traditional, such corrections would be made by modifying data sources directly. However, direct modification of data sources (be it through editing text files, updating stored information in a database, etc.) may have disadvantages. For example, direct modification of data sources may require re-extracting an event stream from the modified sources. Event Stream extraction has the potential to consume a significant amount of time and processing resources, so having to perform event stream extraction after every correction would result in an inefficient workflow, especially when considering that the majority of the extracted events may be the same between runs. Another disadvantage is that directly modifying the data sources may remove the ability to determine which events were sourced directly from the data sources and which events were modified by corrections. Finally, direct modification of the data sources may require the presence of an external version control system, such as a database transaction history or a version control system, if an auditable history of corrections is desired.

Figure 11:
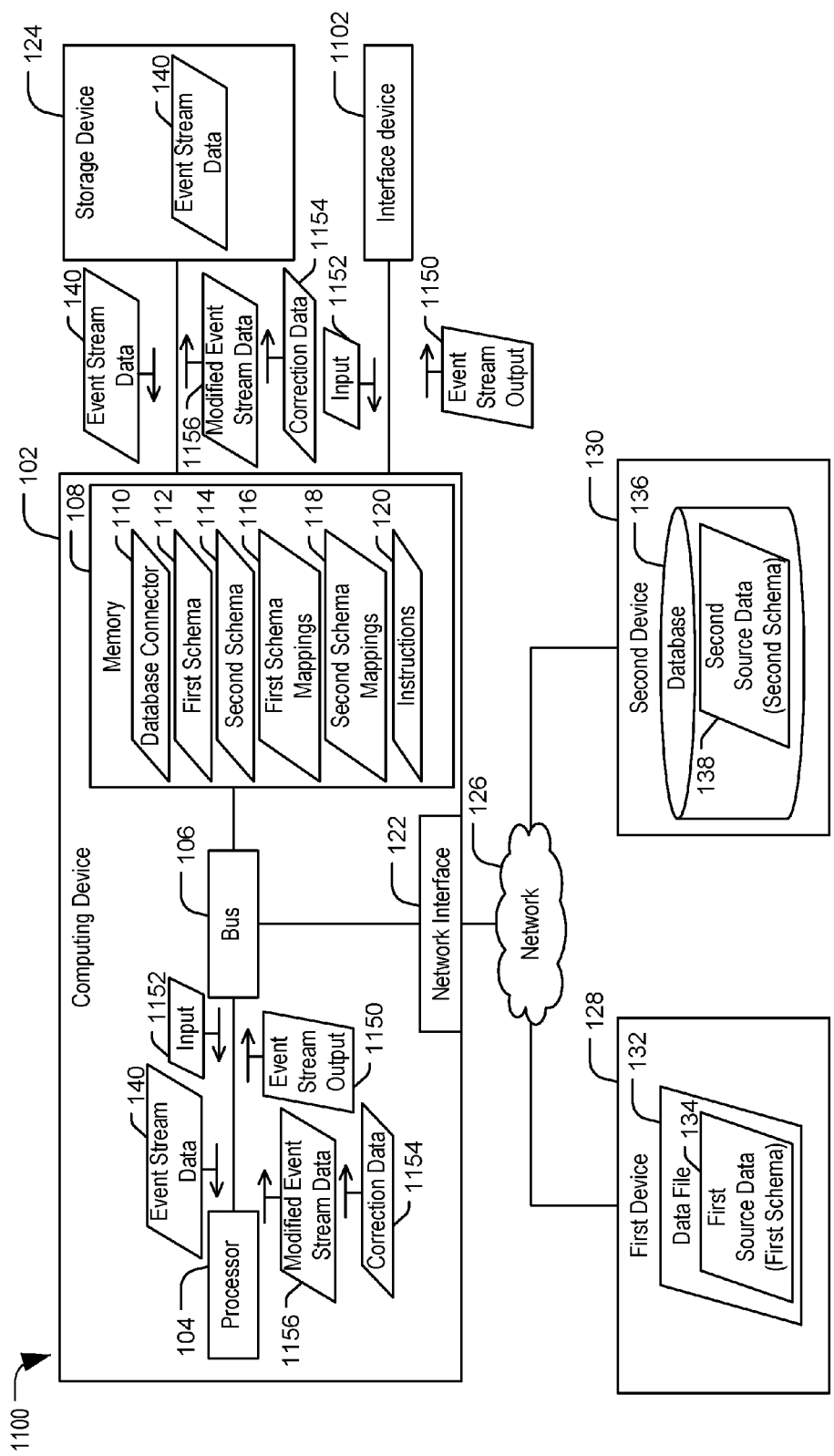
FIG. 11 depicts a diagram of a system for correcting event stream data.

Referring to FIG. 11, a diagram of a system 1100 for correcting event stream data is illustrated. In particular, FIG. 11 illustrates a corrections overlay in which corrections to event streams are implemented as an overlay on top of the event streams rather than being implemented in modifications to the input event streams or underlying data sources. The system 1100 includes one or more components of the system 100. In the example illustrated in FIG. 11, the system 1100 includes the computing device 102, the storage device 124, the network 126, the first device 128, and the second device 130.

The system 1100 further includes an interface device 1102. While illustrated as a single device, the interface device 1102 may include more than one device. The interface device 1102 may include a keyboard device, a mouse device, a speaker device, display device, touch screen device, or any other type of device configured to facilitate input/output operations. In some examples of the system 1100, the interface device 1102 corresponds to the network interface 122.

In operation, the processor 104 receives the event stream data 140. For example, the processor 104 may retrieve the event stream data 140 from the storage device 124, from the memory device 108, or from a memory device internal to the processor 104 (e.g., one or more registers). The processor 104 may generate event stream output 1150 based on the event stream data 140. The event stream output 1150 may correspond to a visual representation of the event stream data 140 to be output at the interface device 1102. The interface device 1102 may receive input 1152 (e.g., after outputting the event stream output 1150) indicating one or more changes to be made to the event stream data 140. For example, the event stream output 1150 may correspond to a graphical user interface depicting a representation of the event stream data 140 and the input 1152 may correspond to input (e.g., user input) responsive to the graphical user interface and identifying changes to be made to the event stream data 140. The graphical user interface may include one or more interactive elements configured to receive user input (e.g., the input 1152). To illustrate, the graphical user interface may include a text entry box, a set of radio buttons, a set of check boxes, one or more slider elements, one or more drag and drop regions, a graphical representation of the event stream data 140, or a combination thereof.

The processor 104 may generate correction data 1154 (e.g., a correction overlay that includes timestamped atomic corrections) based on the input 1152. For example, the processor 104 may include instructions that map the changes to be made to the event stream 140, as indicated by the input 1152, to a sequence of correction events. The correction data 1154 may represent such a series of correction events. Thus, the correction data 1154 may correspond to event stream data (e.g., representing correction events) that may be combined with other event stream data. The processor 104 may combine the event stream data 140 with the correction data 1154 to generate modified event stream data 1156. In particular aspects, the correction data 1154 may primarily be ordered based on timestamp, and then secondarily ordered based on correction type (e.g., if multiple corrections occur at the same moment in time, then deletion corrections may be sequentially ahead of insertion corrections).

In some examples, the correction data 1154 may include edit corrections, insertion corrections, and/or deletion corrections. Thus, generating the modified event stream data 1156 may include modifying an event of the event stream data 140, adding a first event to the event stream data 140, deleting a second event from the event stream data 140, or a combination thereof. Generation of modified event stream data (e.g., the modified event stream data 1156) based on event stream data (e.g., the event stream data 140) and correction data (e.g., the correction data 1154) is described further below with reference to FIG. 12. The processor 104 may output the modified event stream data 1156 and the correction data 1154 for storage at the storage device 124. In some examples of the system 1100, the processor 104 may modify the event stream output 1150 based on the modified event stream data 1156 and receive additional input from the interface device 1102 to further modify the modified event stream data 1156. To illustrate, the graphical user interface (e.g., as displayed at the interface device 1102) corresponding to the event stream output 1150 may be updated as input identifying corrections is received by the computing device 102. Accordingly, a user may interactively modify event stream data using the system 1100.

In particular aspects, the correction data 1154 may be stored, such as in the storage device 124, for subsequent use. To illustrate, the system 1100 may receive input event streams on a monthly basis, where each input event stream includes data for the preceding three months. During a January load, the system 1100 may determine a correction for an event timestamped January 15th. Because the correction data 1154 is stored for reuse, the system 1100 may apply the correction to the January 15 event during the February load and the March load (both of which would include January data due to the three-month sliding window in use) without having to detect the need for the correction or receive user input indicating the need for the correction. It will thus be appreciated that representing and storing correction data for an event stream distinctly from the event stream may enable faster stream correction and may enable a smaller correction data footprint (e.g., because the January 15 correction is stored only once even though it is used three times).

Thus, the system 1100 enables generation of modified event stream data based on event stream data and correction data without modification of source data (e.g., the first source data 134 and the second source data 138) used to generate the event stream data. Accordingly, the source data may be used to generate other event stream data. Further, the system 1100 may enable maintenance of the event stream data in a storage device for future use. Further, by storing the correction data in a storage device, the system 1100 may enable reuse of the correction data to generate additional modified event stream data. In addition, the system 1100 may enable interactive modification of event stream data.

Figure 12:
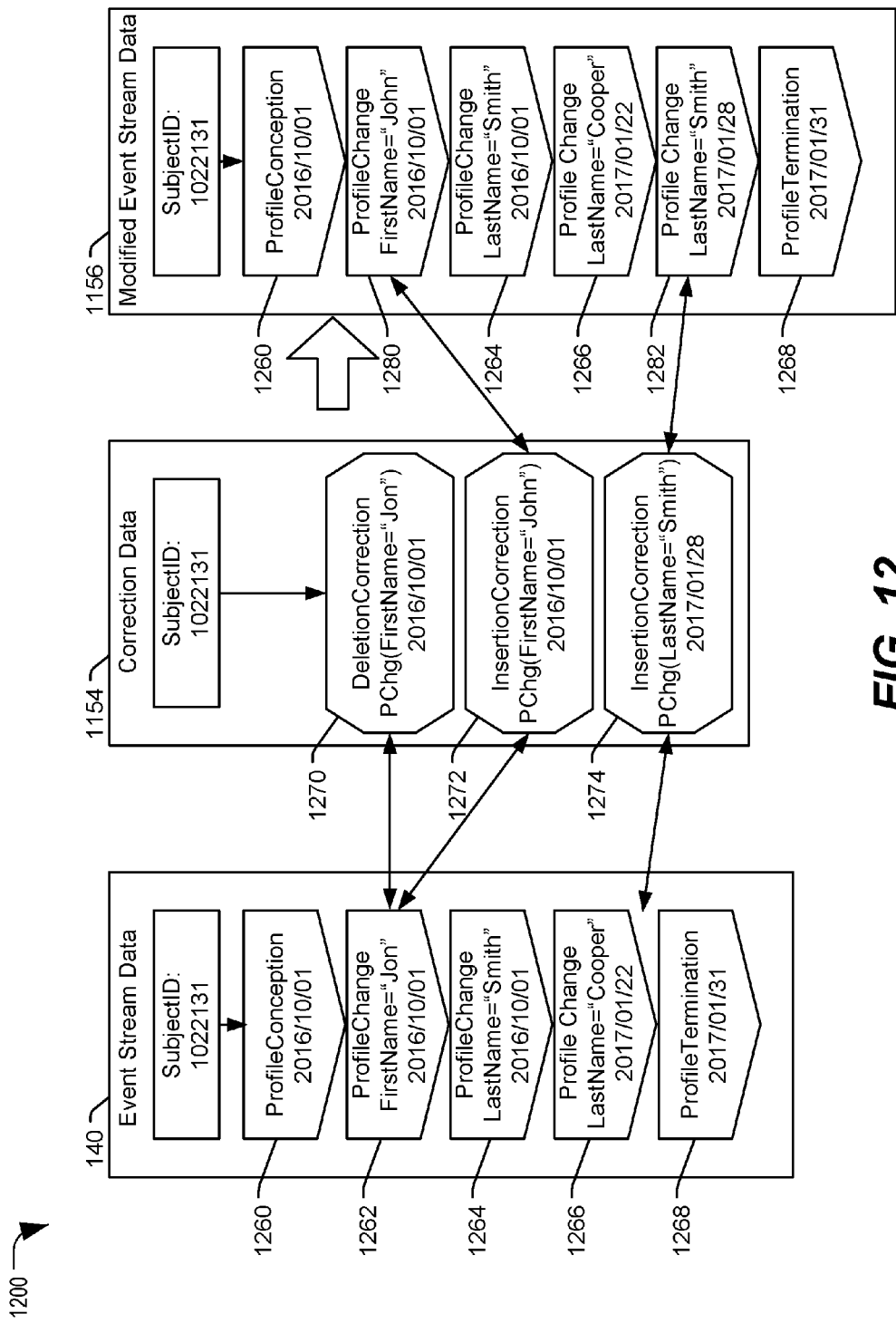
FIG. 12 depicts a diagram illustrating a process for generating modified event stream data.

Referring to FIG. 12, a diagram 1200 illustrating a process for generating modified event stream data is shown. In particular, the diagram 1200 illustrates generation of the modified event stream data 1156 based on the event stream data 140 and the correction data 1154. The process illustrated in the diagram 1200 may be performed by the processor 104 of FIG. 11.

As illustrated in FIG. 12, the event stream data 140 represents a series of events associated with a subject instance identified by a subject identifier "1022131." The series of events depicted in FIG. 12 is for illustrative purposes only and should not be interpreted as limiting. In the illustrated example, the event stream data 140 represents a first event 1260, a second event 1262, a third event 1264, a fourth event 1266, and a fifth event 1268. Each of the events 1260-1268 includes an associated timestamp. The first event 1260 corresponds to a profile conception event. For example, the first event 1260 indicates conception of a profile associated with the subject instance identified by the subject identifier "1022131." The first event 1260 indicates that the conception of the profile occurred on 2016 Oct. 1. The second event 1262 indicates that a value of a FirstName attribute of the subject instance changed to "Jon" on 2016 Oct. 1. The third event 1264 indicates that a value of a LastName attribute of the subject instance changed to "Smith" on 2016 Oct. 1. The fourth event 1266 indicates that the value of the LastName attribute changed to "Cooper" on 2017 Jan. 22. The fifth event 1268 indicates the profile was terminated on 2017 Jan. 31.

As illustrated in FIG. 12, the correction data 1154 represents a series of correction events associated with the subject instance identified by the subject identifier "1022131." The series of correction events depicted in FIG. 12 is for illustrative purposes only and should not be interpreted as limiting. In the illustrated example, the correction data 1154 represents a first correction event 1270, a second correction event 1272, and a third correction event 1274. Each of the correction events 1270-1274 includes an associated timestamp. The first correction event 1270 indicates a deletion correction that deletes the event 1262 that set the value of the FirstName attribute to "Jon" with the timestamp 2016 Oct. 1. The second correction event 1272 indicates an insertion correction that will insert a new event 1280 into the modified event stream data 1156 to set the value of the FirstName attribute to "John" with the timestamp 2016 Oct. 1. The third correction event 1274 indicates an insertion correction that will insert a new event 1282 into the modified event stream data 1156 to set the value of the LastName attribute to "Smith" with the timestamp 2017 Jan. 28. While the correction data 1154 depicts correction events associated with insertion and deletion of events, the correction data 1154 may also or alternatively indicate other types of operations, such as modification of an event.

Based on the correction data 1154, the processor 104 may modify the event stream data 140 to generate the modified event stream data 1156. Alternatively, the processor 104 may generate the modified event stream data 1156 without editing the event stream data 140. Accordingly, the event stream data 140 may be replaced by or maintained alongside the modified event stream data 1156 in the storage device 124. The processor 104 may include a representation of the first event 1260 in the modified event stream data 1156 (e.g., because the correction data 1154 does not indicate deletion or alteration to the first event 1260). The processor 104 may determine that the first correction event 1270 indicates that the second event 1262 is to be deleted. Accordingly, the processor 104 may not include the representation of the second event 1262 in the modified event stream data 1156. The processor 104 may include a representation of the event 1280 in the modified event stream data 1156 in response to the second correction event 1272. The processor 104 may include the representations of the third event 1264 and the fourth event 1266 in the modified event stream data 1156 (e.g., because the correction data 1154 does not indicate deletion or alteration to the third event 1264 or to the fourth event 1266). The processor 104 may include a representation of the event 1282 in the modified event stream data 1156 in response to the third correction event 1274. The processor 104 may include the fifth event 1268 in the modified event stream data 1156 (e.g., because the correction data 1154 does not indicate deletion or alteration to the fifth event 1268).

In some examples, a correction overlay may be applied in accordance with the following pseudocode:

```
correctionsForID={ }
for subjectID←Subject:
    correctionsForID(subjectID)=getAtomicCorrections(subjectID)
function convertToEvents(corrections):
    if corrections.isEmpty==0:
    return nil
    else if corrections.first.isInsertion:
    return   corrections.first.eventToInsert+convertToEvents
        (corrections.tail)
    else:
    return convertToEvents(corrections.tail)
function processCorrections(events, corrections, resolvedEvents):
    if corrections.isEmpty:
    return resolvedEvents+events
    else if events.isEmpty:
    return resolvedEvents+convertToEvents(corrections)
    else:
    firstEvent=events.first
    firstCorrection=corrections.first
    if timeOf(firstEvent)<timeOf(firstCorrection):
        (earlyE,    laterE)=events.splitAt(timeOf(firstCorrection))
        processCorrections(laterE,  corrections,  resolvedEvents+earlyE)
    else if timeOf(firstCorrection)<timeOf(firstEvent):
        (earlyC,    laterC)=corrections.splitAt(timeOf(firstEvent))
        processCorrections(events,  laterC,  resolvedEvents+
            convertToEvents(earlyC))
    else:
        (simultaneousE, laterE)=events.splitAt(timeOf(firstEvent))
```

```
    (simultaneousC, laterC)=events.splitAt(timeOf(first-
        Correction))
    resolvedConflicts=resolveConflicts(simultaneousE,
        simultaneousC)
    processCorrections(laterE, laterC, resolvedEvents+re-
        solvedConflicts)
function resolveConflicts(events, corrections):
    nonDeletedEvents=[ ]
    for event←events:
    sameKeyIdx=−1
    for i=0 until corrections.length:
    if corrections[i].overlaps(event):
        sameKeyIdx=i
        break
    if sameKeyIdx<0:
        nonDeletedEvents+=event
    else:
        thisCorrection=corrections.remove(i)
        if thisCorrection.isDeletion:
            continue
        else:
            //Attempting to insert an event, but an event of that
                type
            //is already there. Ignore this insertion.
            continue
    return nonDeletedEvents+convertToEvents(corrections)
```

Thus, FIG. 12 illustrates how a processor, such as the processor 104, may generate modified event stream data based on correction data and event stream data, where the correction data may itself be an event stream. The modified event stream data may be generated without altering original source data. Thus, methods and systems that operate according as illustrated in FIG. 12 may modify (e.g., correct) event stream data without destructive operation on original source data.

Figure 13:
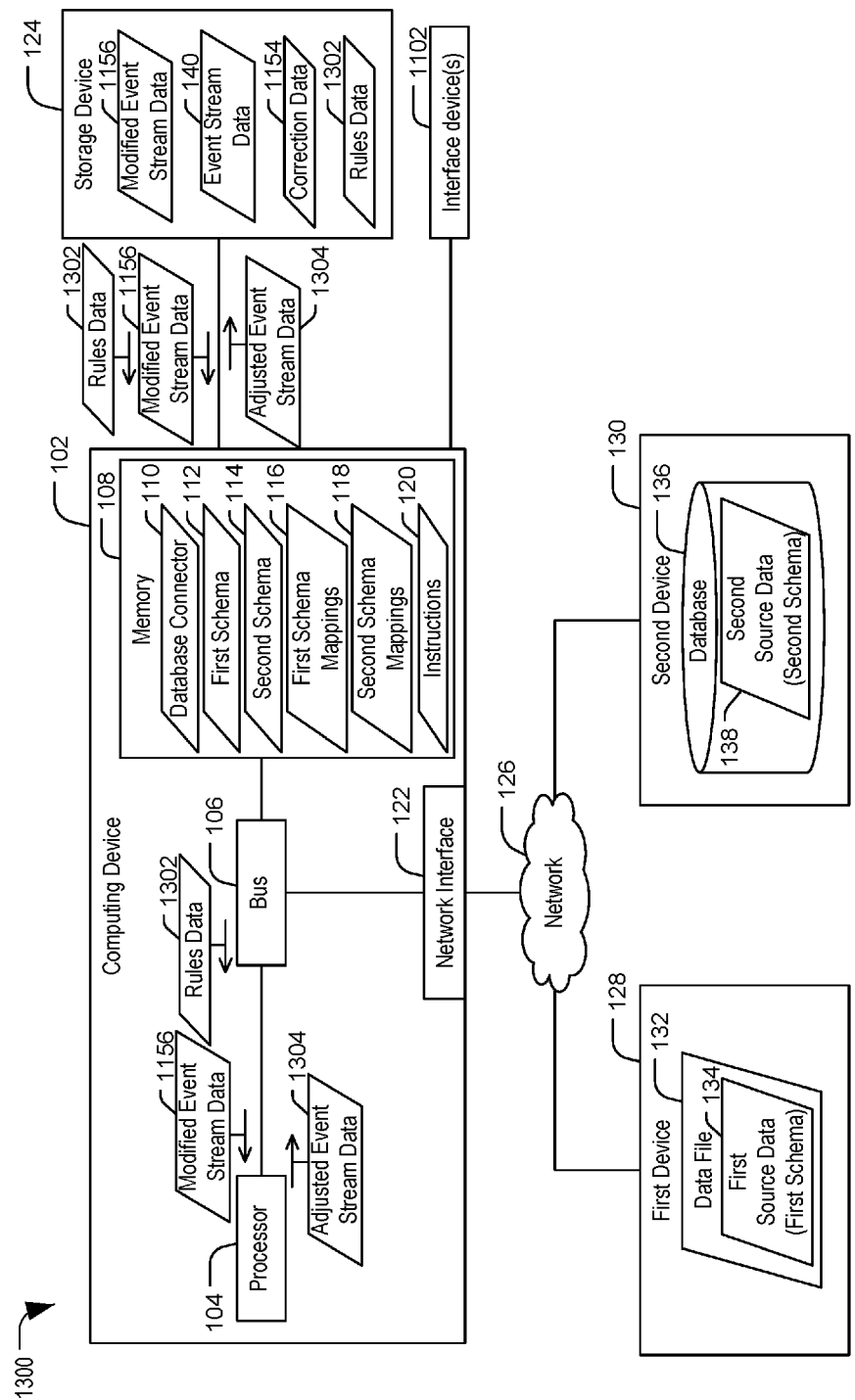
FIG. 13 depicts a diagram of a system for applying rules to event stream data.

Referring to FIG. 13, a diagram of a system 1300 for applying rules to event stream data is illustrated. The example of FIG. 13 illustrates the system 1300 generating adjusted event stream data 1304 based on the modified event stream data 1156. However, the system 1300 may generate the adjusted event stream data 1304 based on other event stream data, such as the event stream data 140.

The system 1300 includes one or more components of the system 100 or the system 1100. In the example illustrated in FIG. 13, the system 1300 includes the computing device 102, the storage device 124, the network 126, the first device 128, the second device 130, and the interface device 1102.

In operation, the processor 104 may receive the modified event stream data 1156. For example, the processor 104 may retrieve the modified event stream data 1156 from the storage device 124, from the memory device 108, or from a memory device internal to the processor 104 (e.g., one or more registers). The processor 104 may further receive rules data 1302. For example, the processor 104 may retrieve the rules data 1302 from the storage device 124, from the memory device 108, or from a memory device internal to the processor 104 (e.g., one or more registers). The processor 104 may generate the adjusted event stream data 1304 based on the modified event stream data 1156 and the rules data 1302. In some examples of the system 1100, the rules data 1302 represents one or more rules that define how one or more event streams are to be modified. The one or more rules may include a filter rule (e.g., rules that filter out particular types of events, rules that filter out all events for particular subject instance(s) that satisfy particular criteria, etc.), a mapping rule (e.g., that results in a join between a key in an event stream and a lookup table or other event stream), a system rule, a multi-subject rule, rules for concatenating strings, rules for applying regular expressions, rules for manipulating dates, or a combination thereof, as described further below with reference to FIGS. 14-17.

Generating the adjusted event stream data 1304 may include filtering an event from the modified event stream data 1156, resolving a mapping indicated by the modified event stream data 1156, enforcing a requirement, or a combination thereof. Enforcing a requirement may include eliminating dependency cycles among subject instances. A dependency cycle may occur when a first subject instance references itself (e.g., Bob Smith reports to Bob Smith) or references a set of subject instances that eventually references the first subject instance. Generation of adjusted event stream data (e.g., the adjusted event stream data 1304) based on event stream data (e.g., the modified event stream data 1156) is described further below with reference to FIG. 12. The processor 104 may output the adjusted event stream data 1304 for storage at the storage device 124.

Thus, the system 1300 enables generation of adjusted event stream data based on event stream data (e.g., the modified event stream data 1156 or the event stream data 140) and rules data. Application of rules data to event stream data may enforce requirements on output event stream data, may filter out particular events, may resolve attribute mappings, etc.

Figure 14:
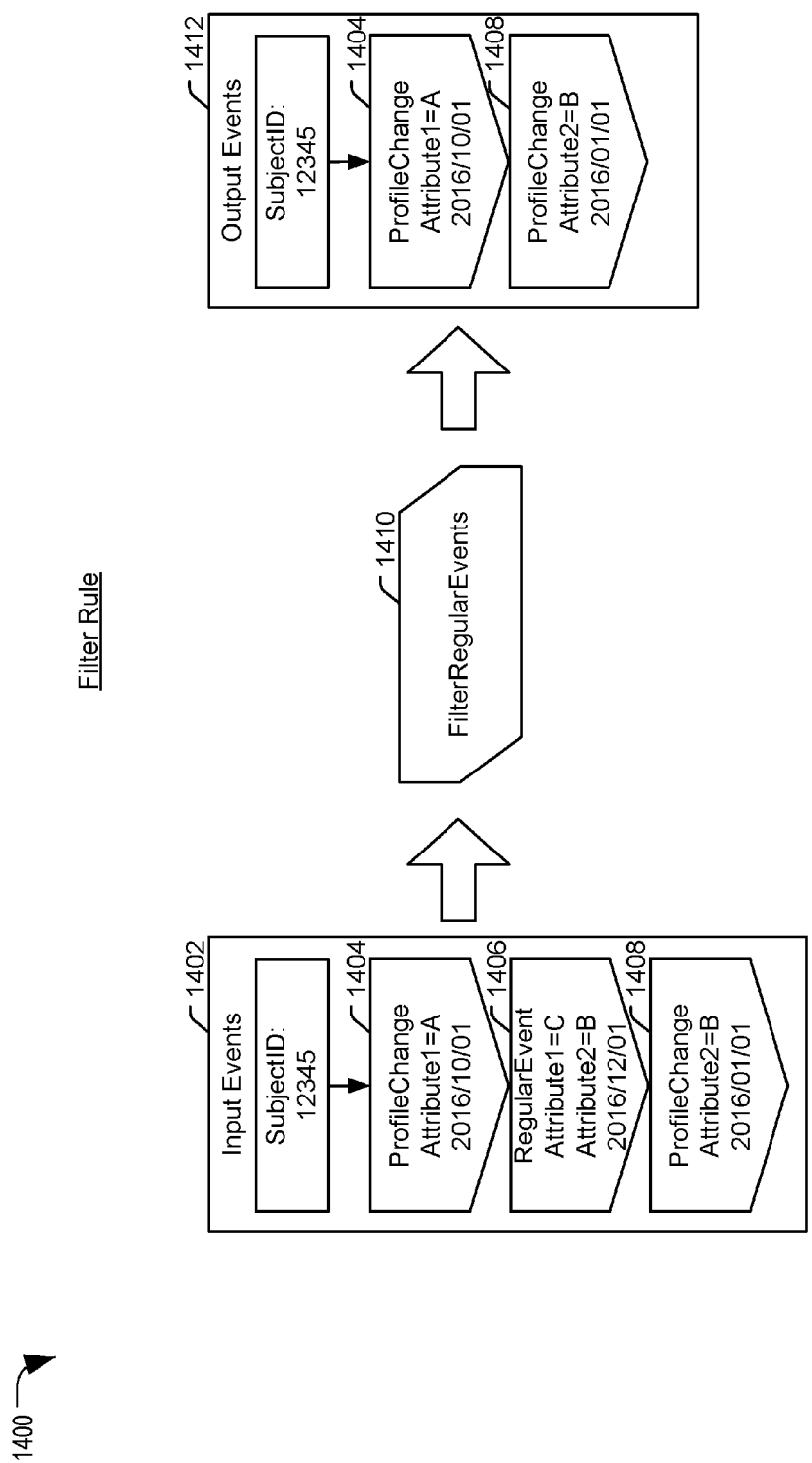
FIG. 14 depicts a diagram of a process of applying a filter rule to event stream data.

Referring to FIG. 14, a diagram 1400 illustrating a process of applying a filter rule 1410 to event stream data (e.g., the event stream data 140 or the modified event stream data 1156) is shown. In particular, the diagram 1400 illustrates application of the filter rule 1410 to input events 1402 (e.g., event stream data). The process illustrated by the diagram 1400 may be performed by the processor 104.

The input events 1402 include a first profile change event 1404, a regular event 1406, and a second profile change event 1408. The filter rule 1410 identifies regular events as a target for filtering. Application of the filter rule 1410 (e.g., by the processor 104) to the input events 1402 may result in output events 1412 (e.g., the adjusted event stream data 1304). The output events 1412 may include the first profile change event 1404 and the second profile change event 1408. The output events 1412 may not include the regular event 1406 because the filter rule 1410 identifies regular events as a target for filtering. For example, the processor 104 may filter the regular event 1406 from the input events 1402 to generate the output events 1412.

Figure 15:
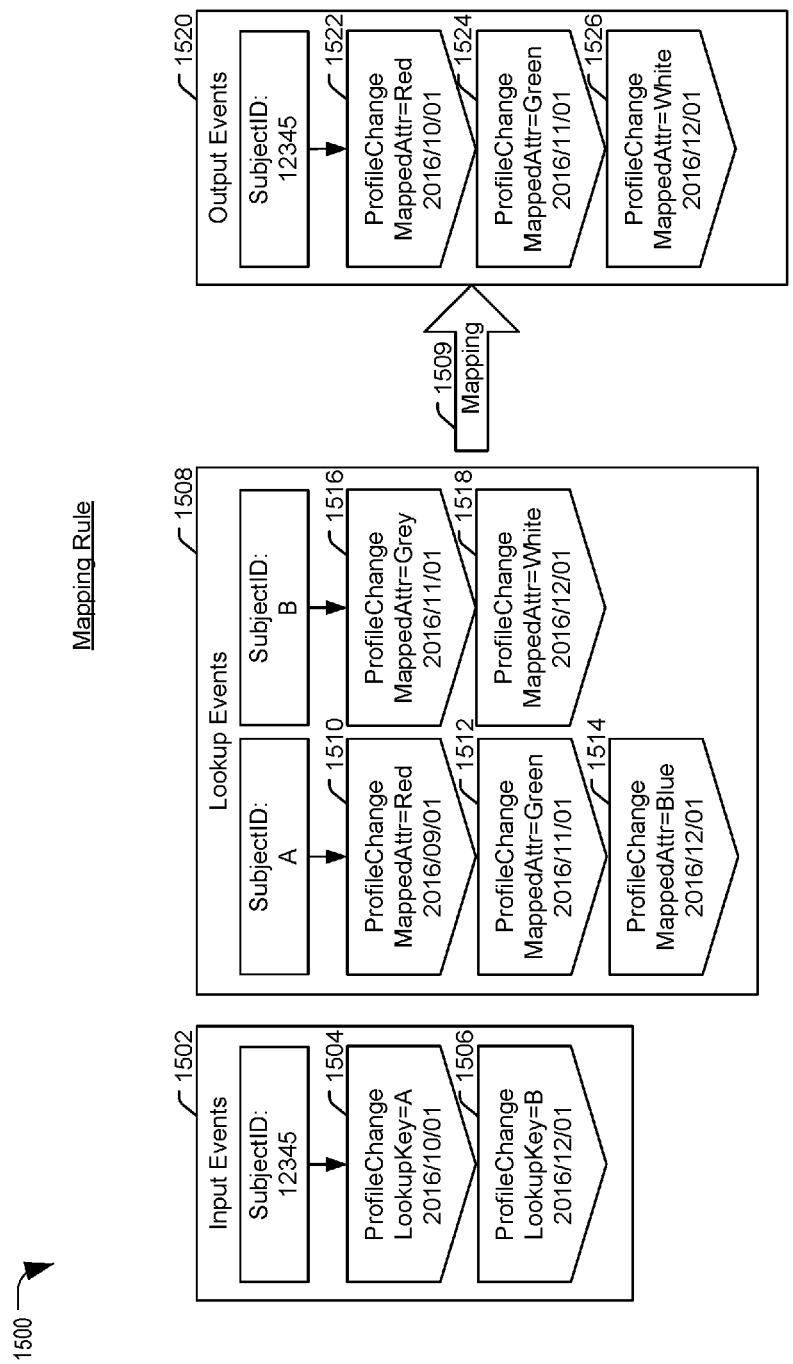
FIG. 15 depicts a diagram of another process of applying a mapping rule to event stream data.

Referring to FIG. 15, a diagram 1500 illustrating another process of applying a mapping rule 1509 to event stream data (e.g., the event stream data 140 or the modified event stream data 1156) is shown. In particular, the diagram 1500 illustrates application of the mapping rule 1509 to input events 1502 (e.g., event stream data) and lookup events 1508. As used herein, lookup events are events that may be referenced by other events. The process illustrated by the diagram 1500 may be performed by the processor 104.

The input events 1502 include a first profile change event 1504 and a second profile change event 1506. The first profile change event 1504 identifies a lookupkey value of "A" and the second profile change event 1506 identifies a lookupkey value of "B." The lookup events 1508 may include a third profile change event 1510, a fourth profile change event 1512, and a fifth profile change event 1514 associated with a subject instance "A." The lookup events 1508 may further include a sixth profile change event 1516 and a seventh profile change event 1518 associated with a subject instance "B." Each of the profile change events 1510-1518 may include a timestamp and a value of a mapped attribute. The mapping rule 1509 may map the values of the lookupkeys included in the profile change events 1504, 1506 to values of the mapped attribute identified by the profile change events 1510-1518.

Application of the mapping rule 1509 (e.g., by the processor 104) to the input events 1502 may result in output events 1520 (e.g., the adjusted event stream data 1304). The output events 1520 may include an eighth profile change event 1522, a ninth profile change event 1524, and a tenth profile change event 1526.

For example, based on values of the lookupkey and the timestamp of the first profile change event 1504, the processor 104 may determine that an attribute value of the subject instance "12345" corresponded to an attribute value of the subject instance "A" on 2016 Oct. 1. The processor 104 may generate the eighth profile change event 1522 based on the third profile change event 1510 because the third profile change event 1510 indicates the attribute value of the subject instance "A" on 2016 Oct. 1 (e.g., because the third profile change event 1510 indicates that the attribute value of the subject instance "A" changed to "Red" on 2016 Sep. 1). The processor 104 may generate the ninth profile change event 1524 based on the fourth profile change event 1512 because the fourth profile change event 1512 indicates the attribute value of the subject instance "A" changed on 2016 Nov. 1 (e.g., to "Green"). Based on values of the lookupkey and the timestamp of the second profile change event 1506, the processor 104 may determine that the attribute value of the subject instance "12345" corresponded to an attribute value of the subject instance "B" on 2016 Dec. 1. The processor 104 may generate the tenth profile change event 1526 based on the seventh profile change event 1518 because the seventh profile change event 1518 indicates the attribute value of the subject instance "B" on 2016 Dec. 1 (e.g., because the seventh profile change event 1518 indicates that the attribute value of the subject instance "B" changed to "White" on 2016 Dec. 1).

Figure 16:
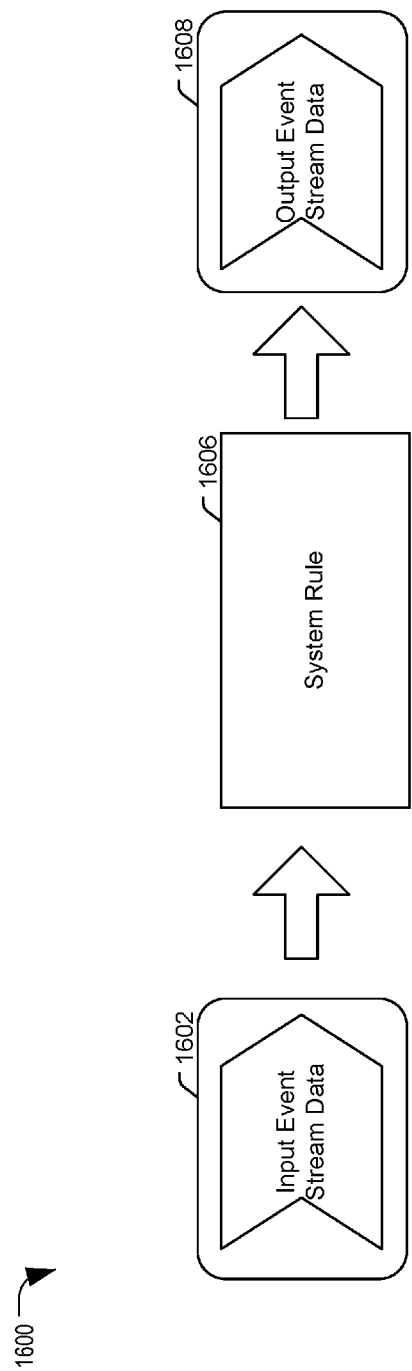
FIG. 16 depicts a diagram of a process of applying a system rule to event stream data.

Referring to FIG. 16, a diagram 1600 illustrating a process of applying a system rule to event stream data (e.g., the event stream data 140 or the modified event stream data 1156) is shown. The process illustrated by the diagram 1600 may be performed by the processor 104. In some examples, system rules may enforce constraints or requirements for a data domain (e.g., human resources data, manufacturing data, healthcare data, etc.). For example, a system rule may eliminate a dependency cycle. As another example, a system rule may adjust profile conception/termination dates so that regular events (e.g., payment events, promotion events, etc.) occur during a period of time that the profile is valid. As yet another example, system rules may enforce that regular events (e.g., payday events) occur periodically as appropriate between profile conception and profile termination events. As illustrated in FIG. 16, the processor 104 may apply a system rule 1606 (e.g., as part of the rules data 1302) to input event stream data 1602 (e.g., the modified event stream data 1156 or the event stream data 140) to generate output event stream data 1608 (e.g., the adjusted event stream data 1304). System rules may thus differ from per-subject rules in that system rules may enforce some implicit constraint on subject instances, whereas per-subject rules may be intended to transform the subject instances.

Figure 17:
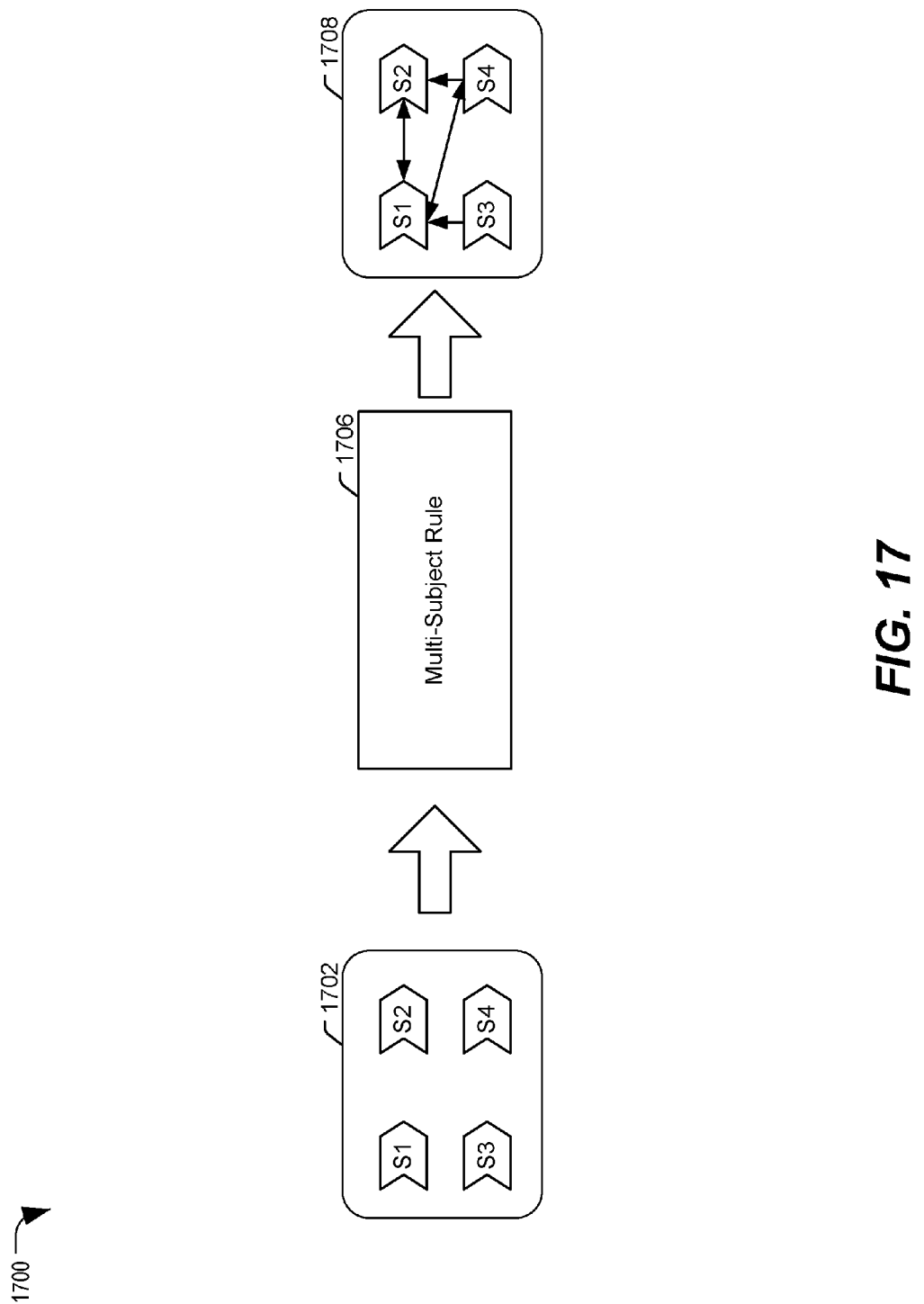
FIG. 17 depicts a diagram of a process of applying a multi-subject rule to event stream data.

Referring to FIG. 17, a diagram 1700 illustrating a process of applying a multi-subject rule to event stream data (e.g., the event stream data 140 or the modified event stream data 1156) is shown. The process illustrated by the diagram 1700 may be performed by the processor 104. Multi-subject rules may affect more than one event stream, such as when different event streams correspond to different subjects. For example, a multi-subject rule may populate an attribute of a first subject instance of a first subject based on an attribute of a second subject instance of a second subject. As another example, a first subject instance of a first subject may be modified or deleted based on a relationship between the first subject instance and a second subject instance of a second subject. In some examples, multi-subject rules may include lookup rules (e.g., assigning names to the members of a supervisory hierarchy, where the supervisory hierarchy corresponds to an "Organization" subject, while the names of would looked up in an "Employee" subject). Multi-subject rules may also include domain-specific rules (e.g., removing all member of an organizational hierarchy that have no members reporting to them, which would involve examining both the Employee event stream as well as the Organization event stream over various time periods to remove invalid organization subject instances).

As illustrated in FIG. 17, the processor 104 may apply a multi-subject rule 1706 (e.g., as part of the rules data 1302) to input event stream data 1702 (e.g., the modified event stream data 1156 or the event stream data 140) to generate output event stream data 1708 (e.g., the adjusted event stream data 1304).

It is to be understood that various rules may be used during event stream processing in accordance with the present disclosure. Because rules may "consume" and event stream and may "return" an event stream, rules may be reordered, removed, and/or added with little or no impact to other parts of an event stream loader operating in accordance with the present disclosure. Further, event streams may be "checkpointed," such as by caching the event stream in memory to iterate over a single rule rather than having to run all rules. Alternatively, or in addition, event streams may be serialized to disk and/or across nodes of a network.

A first illustrative non-limiting example of a rule is a system rule for conception/termination event validation. Data sources may usually provide two sources to indicate a subject instance's existence: event-based conception termination, and snapshot-based subject profiles. Sometimes, the two sources may be inconsistent with each other. For example, an employee may start to have snapshot profiles but no corresponding hire event may be provided, or an employee's snapshot profile may disappear but a termination event may be missing. This rule maintains consistency in conception/termination events. Application of the rule may "stretch" profiles to exact conception/termination event dates and may generate system conception/termination events to match profiles if the events are missing. After the rule is applied, each subject instance's conception/termination events should align with its profiles. By implementing this consistency, more correct and useful information may be derived from the event data. For example, in the human resources domain, an employee's life cycle may be complete and their incoming outgoing movement numbers may "add up," so that employee movement in and out of organizations is represented accurately. In an alternative aspect, if there is a snapshot-based profile for a subject but no conception or termination event provided, this rule may generate the conception or termination events.

Another illustrative non-limiting example of a rule is a system rule for regular event validation. Subject event data may fall out of a validity range of the underlying subject instance, such as when a pay event occurs after the employee is terminated, or when a training event occurs before the employee is hired. Such events may not be suitable for analysis, because they may appear untied to a valid subject instance. This rule may fix this issue by "stretching" a subject instance's profile to cover such event outliers. According to the rule, a subject profile may be pushed back to the earliest event date of all outliers and may be pushed forward to the latest event date of all outliers. The resulting stretched validity time period may be flagged as inactive, so that validity of the subject instance is still respected. In a particular aspect, application of this rule may initially result in building two sequences of events: one sequence for all regular events and another sequence for profile start and end events, including all profile change events between the start and end events. Next, each regular event may be examined to determine which profile the regular event should link to by comparing the event date of the regular event to the start and end date of the profile. If no matching profile is found, a closest profile may be selected to link to the regular event, and the selected profile may be "stretched" accordingly.

Figure 18:
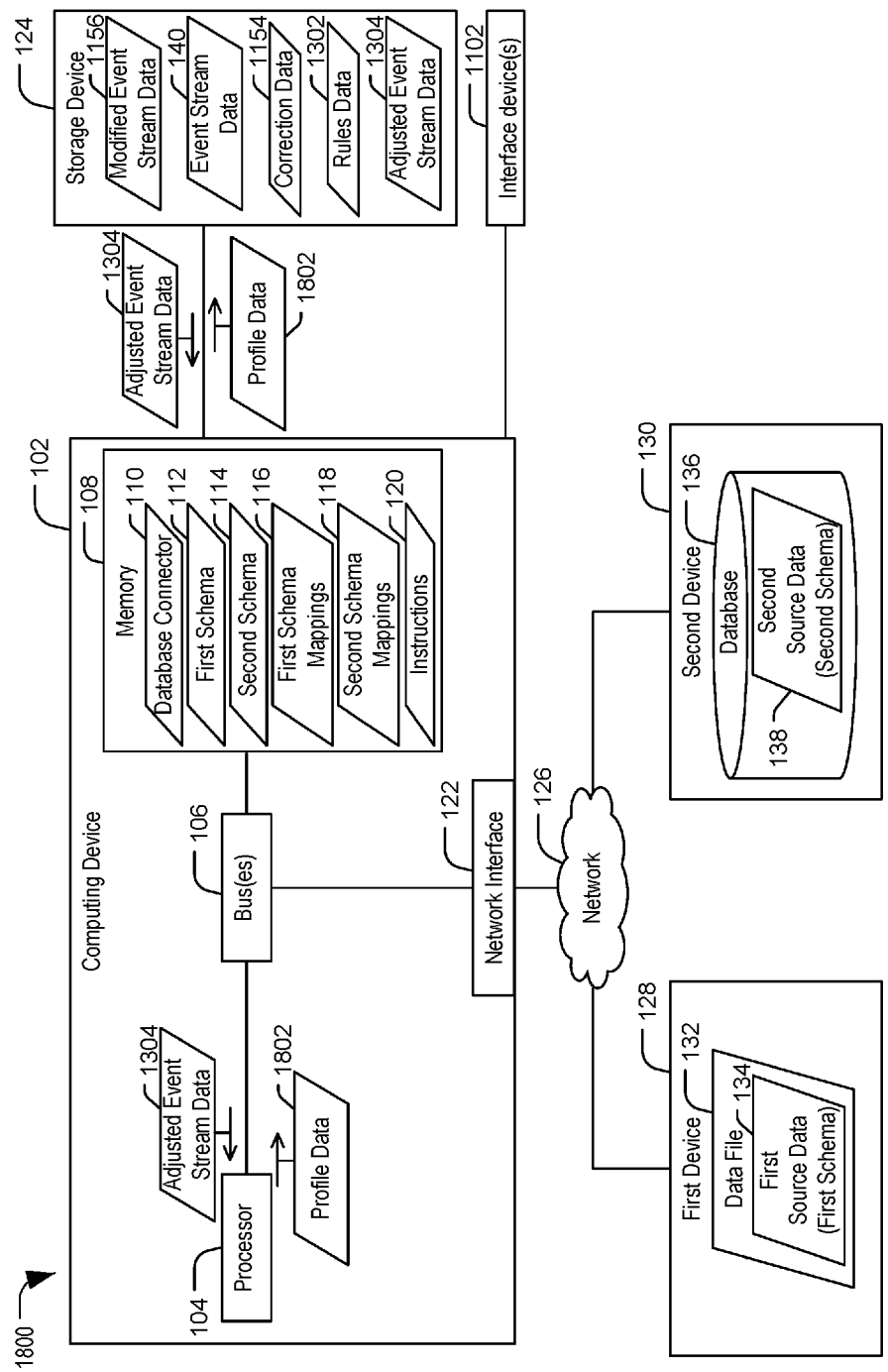
FIG. 18 depicts a diagram of a system for generating profile data based on event stream data.

Referring to FIG. 18, a diagram of a system 1800 for generating profile data based on event stream data is illustrated. The example of FIG. 18 illustrates the system 1800 generating profile data 1802 based on the adjusted event stream data 1304. However, the system 1800 may generate the profile data 1802 based on other event stream data, such as the event stream data 140 or the modified event stream data 1156.

The system 1800 includes one or more components of the system 100, the system 1100, and/or the system 1300. In the example illustrated in FIG. 18, the system 1800 includes the computing device 102, the storage device 124, the network 126, the first device 128, the second device 130, and the interface device 1102.

In operation, the processor 104 may receive the adjusted event stream data 1304. For example, the processor 104 may retrieve the adjusted event stream data 1304 from the storage device 124, from the memory device 108, or from a memory device internal to the processor 104 (e.g., one or more registers). The profile data 1802 may indicate a plurality of profile records. Each profile record may include a description (e.g., attribute values) of a subject instance that is valid at a particular point in time. The profile data 1802 may include profile records associated with a plurality of subject instances. Since the adjusted event stream data 1304 indicates a series of events (e.g., changes to one or more subject instances), the processor 104 may generate the profile data 1802 based on the adjusted event stream data 1304. In some examples, the profile data 1802 may be structured according to an output schema. The output schema may correspond to the first schema 112, to the second schema 114, or may be distinct from the first schema 112 and the second schema 114 (e.g., may correspond to a schema compatible with a data model of a target analytics application). Generation of the profile data 1802 is described further below with reference to FIG. 19. The processor 104 may output the profile data 1802 for storage at the storage device 124. In some implementations of the system 1800, the computing device 102 may output the profile data 1802 via the network interface 122. For example, the computing device 102 may transmit the profile data to a device in communication with the network 126.

Thus, the system 1800 enables generation of profile data based on event stream data (e.g., the adjusted event stream data 1304, the modified event stream data 1156, or the event stream data 140). The profile data 1802 may be structured according to an output schema. Such an output schema may correspond to a data analytics application. Accordingly, the system 1800 may enable profile data to be output to a data analytics application regardless of how data used to generate the profile data is structured.

Figure 19:
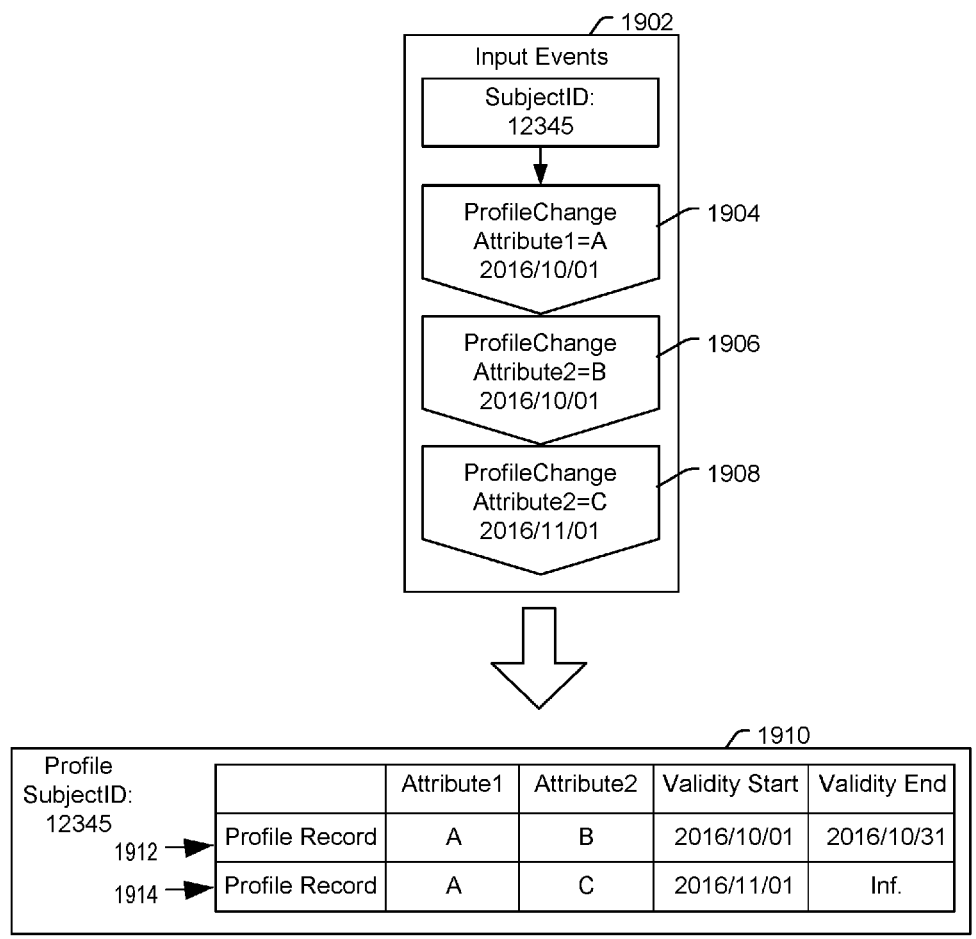
FIG. 19 depicts a diagram of a process of generating profile data based on event stream data.

Referring to FIG. 19, a diagram 1900 illustrating a process of generating profile data based on event stream data (e.g., the adjusted event stream data 1304, the event stream data 140, or the modified event stream data 1156) is shown. The process illustrated by the diagram 1900 may be performed by the processor 104.

As illustrated in FIG. 19, input events 1902 (e.g., event stream data) includes a first profile change event 1904, a second profile change event 1906, and a third profile change event 1908 associated with a subject instance "12345." The first profile change event 1904 indicates that a value of an Attribute1 of the subject instance "12345" changed to "A" on 2016 Oct. 1. The second profile change event 1906 indicates that a value of an Attribute2 of the subject instance "12345" changed to "B" on 2016 Oct. 1. The third profile change event 1908 indicates that the value of the Attribute2 of the subject instance "12345" changed to "C" on 2016 Nov. 1. It is to be understood that "A," "B," and "C" in this example may be actual data values or may be lookup keys. To illustrate, if "A" is a lookup key rather than an actual data value, a separate lookup table may map "A" to different data values on different dates/times. It will be appreciated that using lookup keys in profile data may save storage space, especially when certain data values are long and/or repeated. To illustrate, some employee attributes may be common, such as names (e.g., "David," "Jason," "Smith," etc.), hiring dates (e.g., a new class of employees may all have the same hiring date), roles (e.g., "junior engineer"), places (e.g., "United States," "Vancouver," etc.). Using a shorter lookup key (e.g., Role1) in the profile data rather than a longer data value (e.g., "junior engineer") may reduce the size of each profile record for each employee. In some examples the same lookup table(s) may be used during different data loads, even when a source or a target schema has changed.

Based on the input events 1902, the processor 104 may generate a profile 1910 (e.g., the profile data 1802). The processor 104 may generate a first record 1912 of the profile 1910 based on the first profile change event 1904 and the second profile change event 1906. The processor 104 may generate a second record 1914 of the profile 1910 based on the first profile change event 1904 and the third profile change event 1908. The profile 1910 may be structured according to an output schema that is compatible with an analytics application. Each record 1912, 1914 may have a validity start date/time and a validity end date/time, as shown. In the illustrated example, the validity end date/time for the record 1914 is infinity or undefined as there is no later event that terminates/ends the subject member.

Although not shown in FIG. 19, it should be noted that the same stream may be used to generate multiple profiles. For example, profile change events may be used to calculate profile attributes and generate profiles as described with reference to the profile 1910, but regular events may be output to a separate table. The separate table may include columns for SubjectID, Event Detail, and Date. To illustrate, if a pay event is present between the events 1906 and 1908, such a pay event may be output to a separate table.

Figure 20:
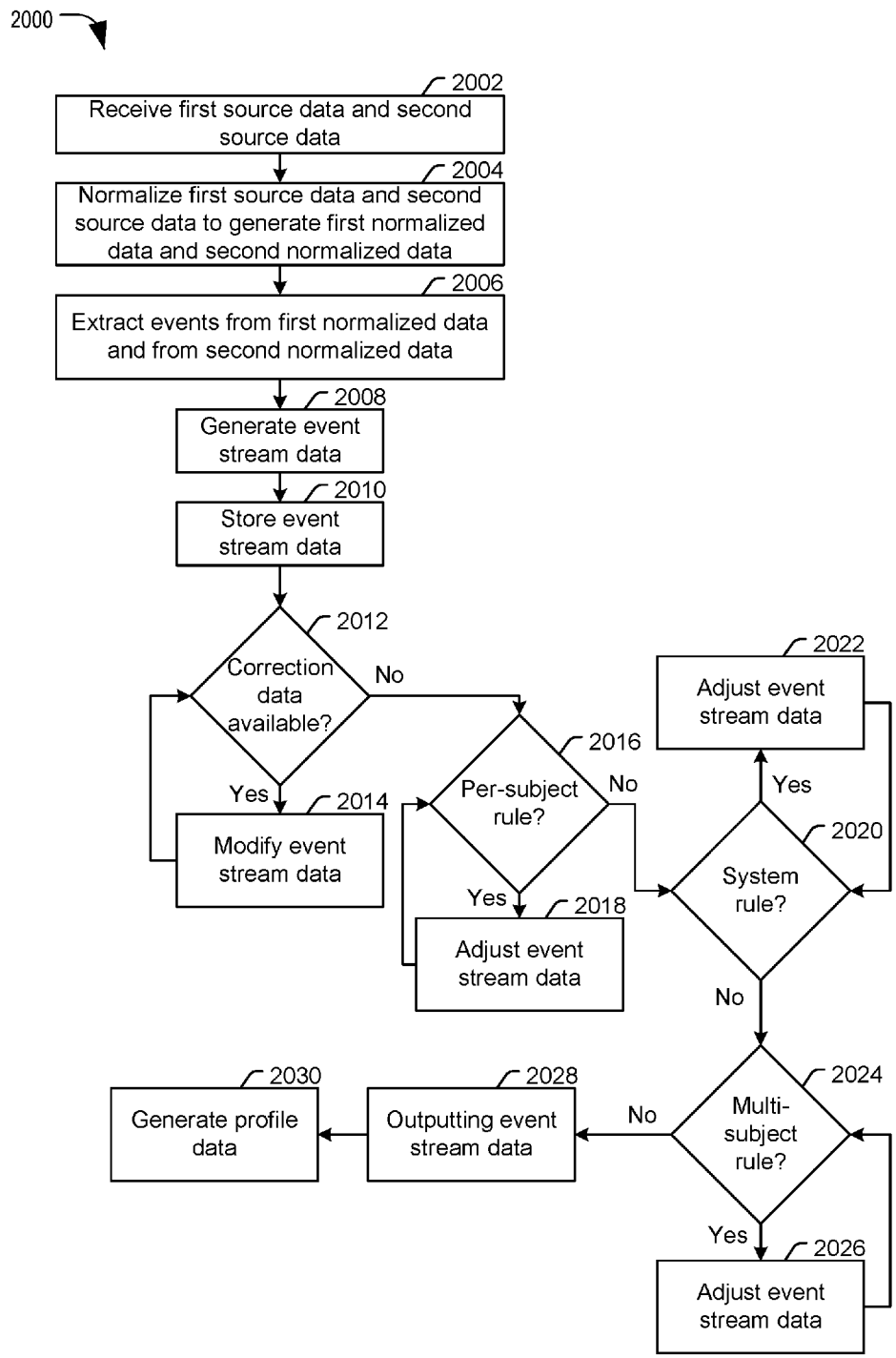
FIG. 20 depicts a flowchart illustrating a method of outputting profile data.

Referring to FIG. 20, a flowchart illustrating a method 2000 of outputting profile data is shown. The method 2000 may be performed by components of the systems 100, 1100, 1300, and/or 1800. For example, the method 2000 may be performed by the processor 104. The method 2000 includes receiving first source data and second source data, at 2002. For example, the processor 104 may receive the first source data 134 and the second source data 138. The first source data and the second source data may be structured according to different schema. For example, the first source data 134 may be structured according to the first schema 112 and the second source data 138 may be structured according to the second schema 114.

The method 2000 further includes normalizing the first source data and the second source data to generate first normalized data and second normalized data, at 2004. For example, the processor 104 may generate the first normalized data 206 based on the first source data 112, as described with respect to FIGS. 1, 3, and 4. Further, the processor 104 may generate the second normalized data 224 based on the second source data 114, as described with reference to FIGS. 1, 3, and 5.

The method 2000 further includes extracting events from the first normalized data and from the second normalized data, at 2006. For example, the processor 104 may extract events from the first normalized data 206 and from the second normalized data 224, as described with reference to FIGS. 1, 3, and 9.

The method 2000 further includes generating event stream data, at 2008. For example, the processor 104 may generate the event stream data 140 based on the events extracted from the first normalized data 206 and the second normalized data 224, as described with reference to FIGS. 1, 3, 9, and 10.

The method 2000 further includes storing the event stream data, at 2010. For example, the processor 104 may output the event stream data 140 for storage at the storage device 124, as descried with reference to FIG. 1.

The method 2000 further includes determining whether correction data is available, at 2012. If correction data is available, the method 2000 includes modifying the event stream data, at 2014, and returning to 2012 to determine if additional correction data is available. For example, the processor 104 may determine whether the correction data 1154 has been generated based on the input 1152. If the correction data 1154 has been generated, the processor 104 may generate the modified event stream 1156 based on the event stream data 140 and the correction data 1154. The processor 104 may continue to monitor for additional input received the interface device 1102 and generate additional correction data based on any additional input. Based on the additional correction data, the processor 104 may further modify the modified event stream data 1156.

If no correction data is available, the method 2000 further includes determining whether a per-subject rule applicable to the event stream data exists, at 2016. If there is an applicable per-subject rule, the method 2000 includes adjusting the event stream data, at 2018, and returning to 2016 to determine whether there is an additional per-subject rule applicable to the event stream data. For example, the processor 104 may determine whether the rules data 1302 includes a per-subject rule. If the rules data 1302 includes such a rule, the processor 104 may generate (or modify) the adjusted event stream data 1304 based on the modified event stream data 1156, the event stream data 140, or the adjusted event stream data 1304 and the rules data 1302, as described with reference to FIGS. 13-15. The processor 104 may determine whether the rules data 1302 includes additional per-subject rules and further adjust the adjusted event stream data 1304 based on any additional such rules.

If there is no applicable per-subject rule, the method 2000 further includes determining whether a system rule applicable to the event stream data exists, at 2020. If there is an applicable system rule, the method 2000 includes adjusting the event stream data, at 2022, and determining whether there is an additional system rule applicable to the event stream data, at 2020. For example, the processor 104 may determine whether the rules data 1302 includes a system rule. If the rules data 1302 includes a system rule, the processor 104 may generate (or modify) the adjusted event stream data 1304 based on the modified event stream data 1156, the event stream data 140, or the adjusted event stream data 1304 and the rules data 1302, as described with reference to FIGS. 13 and 16. The processor 104 may determine whether the rules data 1302 includes additional system rules and further adjust the adjusted event stream data 1304 based on any additional system rules.

If there is no applicable system rule, the method 2000 further includes determining whether a multi-subject rule applicable to the event stream data exists, at 2024. If there is an applicable multi-subject rule, the method 2000 includes adjusting the event stream data, at 2026, and determining whether there is an additional multi-subject rule applicable to the event stream data, at 2024. For example, the processor 104 may determine whether the rules data 1302 includes a multi-subject rule. If the rules data 1302 includes a multi-subject rule, the processor 104 may generate (or modify) the adjusted event stream data 1304 based on the modified event stream data 1156, the event stream data 140, or the adjusted event stream data 1304 and the rules data 1302, as described with reference to FIGS. 13 and 17. The processor 104 may determine whether the rules data 1302 includes additional multi-subject rules and further adjust the adjusted event stream data 1304 based on any additional multi-subject rules.

If there is no applicable multi-subject rule, the method 2000 further includes outputting the event stream data, at 2024. For example, the processor 104 may output the event stream data 140, the modified event stream data 1156, or the adjusted event stream data 1304 for storage at the storage device 124.

The method 2000 further includes generating profile data, at 2030. For example, the processor 104 may generate the profile data 1802 based on the adjusted event stream data 1304, the modified event stream data 1156, or the event stream data 140, as described with reference to FIGS. 18 and 19. The profile data 1802 may be structured according to an output schema. The output schema may be compatible with an analytics application executed at the computing device 102 or at a device in communication with the network 126. In some examples of the method 2000, the method 2000 includes formatting the profile data 1802 according to a format compatible with the analytics application. To illustrate, the processor 104 may output the profile data 1802 in a comma delimited format, a tab delimited format, or in another type of format.

Thus, the method 2000 may be used to generate profile data from data sources that are structure according to different schema. Such profile data may be used by an analytics application that may be incompatible with one or more schema of the data sources. In some examples, the profile data output by the method 2000 may be provided as input into one or more analytics applications.

Figure 21:
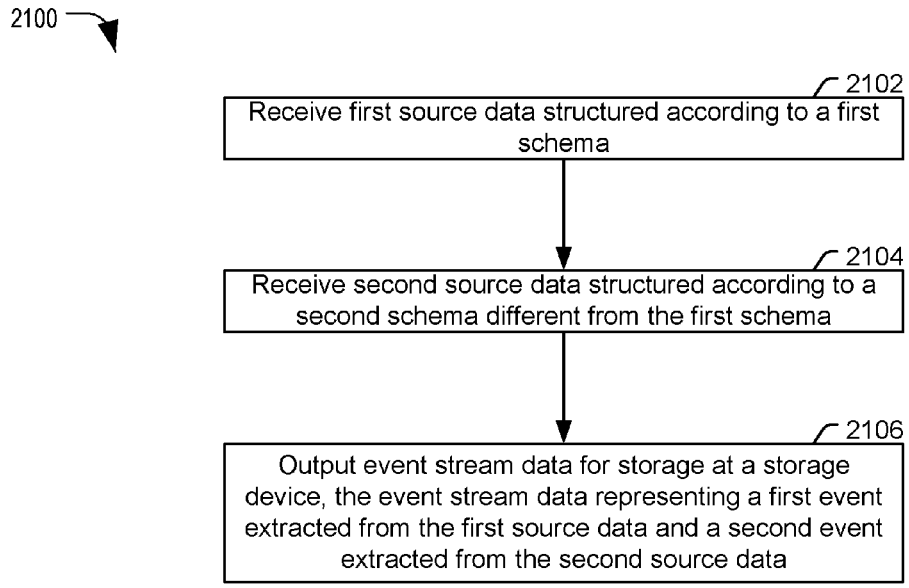
FIG. 21 depicts a flowchart illustrating a method of outputting event stream data.

Referring to FIG. 21, a flowchart illustrating a method 2100 of outputting event stream data is shown. The method 2100 may be executed by a processor, such as the processor 104. The method 2100 includes receiving first source data structured according to a first schema, at 2102. For example, the processor 104 may receive the first source data 134 structured according to the first schema 112.

The method 2100 further includes receiving second source data structured according to a second schema different from the first schema, at 2104. For example, the processor 104 may receive the second source data 138 structured according to the second schema 114.

The method 2100 further includes outputting event stream data for storage at a storage device, at 2106. For example, the processor 104 may generate the event stream data 140 based on the first source data 134 and the second source data 138. The processor 104 may output the event stream data 140 to the storage device 124 for storage. The event stream data represents a first event extracted from the first source data and a second event extracted form the second source data. To illustrate, the processor 104 may perform a first normalization operation 204 on the first source data 112 to generate the first normalized data 206. The processor 104 may perform the first event extraction operation 216 on the first normalized data 206 to extract events from the first normalized data 206 and generate the first event stream data 218. The processor 104 may perform the second normalization operation 222 on the second source data 114 to generate the second normalized data 224. The processor 104 may perform the second event extraction operation 226 on the second normalized data 224 to extract events from the second normalized data 224 and to generate the second event stream data 228. The processor 104 may perform the event stream combination operation 220 on the first event stream data 218 and the second event stream data 228 to generate the event stream data 140.

Thus, the method 2100 may be used to generate event stream data from source data structured according to different schemas. Accordingly, the method 2100 may enable greater flexibility in storage of source data used to generate event stream data.

Figure 22:
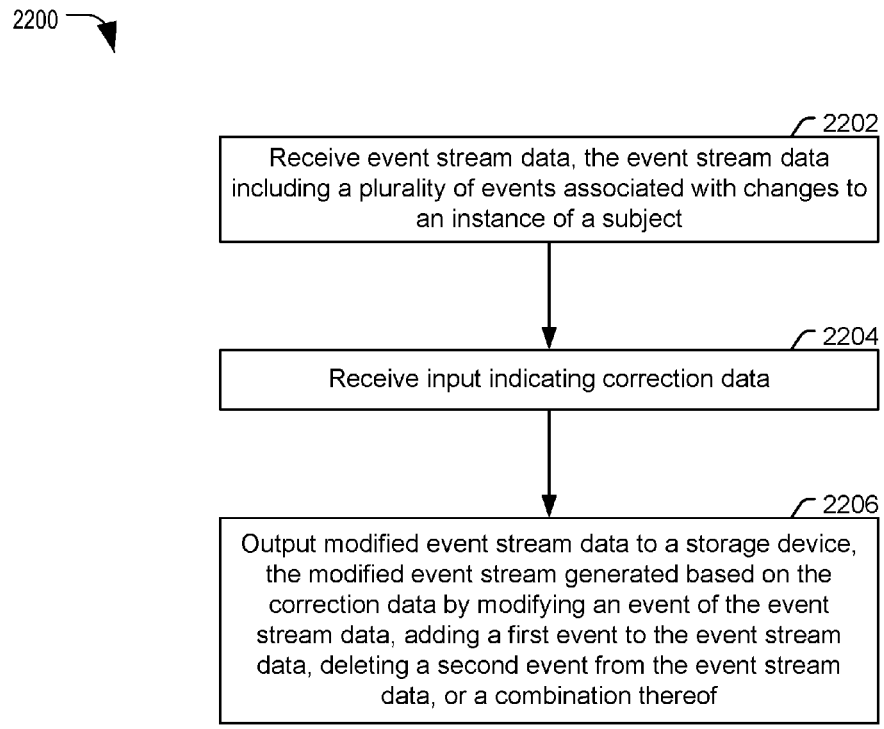
FIG. 22 depicts a flowchart illustrating a method of outputting modified event stream data.

Referring to FIG. 22, a flowchart illustrating a method 2200 of outputting modified event stream data is shown. The method 2200 may be performed by the processor 104. The method 2200 includes receiving event stream data, the event stream data including a plurality of events associated with changes to an instance of a subject, at 2202. For example, the processor 104 may receive the event stream data 140 from the storage device 124, the memory device 108, or a memory device internal to the processor 104. The event stream data 140 may represent a series of events associated with an instance of a subject. For example, the event stream data 140 may represent a series of events associated with an employee named "John Smith," where "employee" is the subject (e.g., a category) and "John Smith" is an instance (e.g., a particular example) of the subject.

The method 2200 further includes receiving input indicating correction data, at 2204. For example, the processor 104 may receive the input 1152 from the interface device 1102. Based on the input 1152, the processor 104 may generate the correction data 1154.

The method 2200 further includes outputting modified event stream data to a storage device, at 2206. The modified event stream is generated based on the correction data by modifying an event of the event stream data, adding a first event to the event stream data, deleting a second event from the event stream data, or a combination thereof. For example, the processor 104 may generate the modified event stream data 1156 based on the event stream data 140 and the correction data 1154. Generating the modified event stream data 1156 may include modifying a representation of an event included in the event stream data 140 (e.g., including a modified version of the event in the modified event stream data 1156), deleting a representation of an event from the event stream data 140 (e.g., not including the event in the modified event stream data 1156), adding an event to the event stream data 140 (e.g., including the event in the modified event stream data 1156). The processor 104 may output the modified event stream data 1156 to the storage device 124 for storage.

Thus, the method 2200 may enable modification and storage of event stream data. Since the method 2200 does not alter source data, the event stream data may be modified without destroying the source data used to generate the event stream data. Accordingly, the method 2200 may enable greater flexibility in data storage by maintaining source data that may be used in the future.

Particular aspects of the present disclosure have thus been described herein with reference to the drawings. Particular features illustrated or discussed with respect to one drawing may be usable in combination with other implementations (e.g., as described with reference to other drawings) according to the disclosure. Further, illustrated method steps may be optional, may be combined with method steps presented in a different drawing, or may be performed in a different order than is presented in a drawing. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. As used herein, the terms "computer-readable storage device" and "memory device" refer to articles of manufacture and not to signals.

A disclosed method includes receiving, at a processor, first source data structured according to a first schema. The method further includes receiving, at the processor, second source data structured according to a second schema different from the first schema. The method further includes outputting, by the processor, event stream data for storage at a storage device, the event stream data representing a first event extracted from the first source data and a second event extracted from the second source. The event stream data includes a plurality of events corresponding to changes associated with a subject instance. The method includes generating a profile of the subject instance based on the event stream data. The profile indicates a chronology of the changes associated with the subject instance.

A disclosed apparatus includes a storage device and a processor. The processor is configured to receive first source data structured according to a first schema. The processor is further configured to receive second source data structured according to a second schema different from the first schema. The processor is further configured to output event stream data for storage at the storage device. The event stream data represents a first event extracted from the first source data and a second event extracted from the second source. The event stream data includes a plurality of events corresponding to changes associated with a subject instance. The processor is configured to generate a profile of the subject instance based on the event stream data. The profile indicates a chronology of the changes associated with the subject instance.

A disclosed computer-readable storage device stores instructions, that when executed by a processor, cause the processor to perform operations including receiving first source data, the first source data structured according to a first schema. The operations further include receiving second source data, the second source data structured according to a second schema different from the first schema. The operations further include outputting event stream data for storage at a storage device. The event stream data represents a first event extracted from the first source data and a second event extracted from the second source. The event stream data includes a plurality of events corresponding to changes associated with a subject instance. The operations include generating a profile of the subject instance based on the event stream data. The profile indicates a chronology of the changes associated with the subject instance.

A disclosed computer-readable storage device stores instructions, that when executed by a processor, cause the processor to perform operations including receiving, at a network interface of a computing device, data from a data source. The operations also include extracting, by a processor of the computing device, events from the data to generate an event stream, each event of the event stream corresponding to a change associated with a subject instance. The operations further include applying, by the processor, a correction overlay to the event stream to generate a corrected stream. The operations include adjusting, by the processor, one or more events of the corrected stream based on application of a set of rules to generate an adjusted event stream. The operations also include generating, by the processor, a profile of the subject instance based on the adjusted event stream, the profile indicating a chronology of changes associated with the subject instance.

Another disclosed method includes receiving, at a processor of a computing device, event stream data. The event stream data includes a plurality of events associated with changes to an instance of a subject. The method further includes receiving, at the processor of the computing device, input indicating correction data. The method further includes outputting, from the processor of the computing device, modified event stream data to a storage device. In particular examples of the method, the modified event stream data is generated by modifying an event of the event stream data, adding a first event to the event stream data, deleting a second event from the event stream data, or a combination thereof.

Another disclosed computer-readable storage device stores instructions, that when executed by a processor, cause the processor to perform operations including receiving event stream data. The event stream data includes a plurality of events associated with changes to an instance of a subject. The operations further include receiving input indicating correction data. The operations further include outputting modified event stream data to a storage device. In particular examples of the computer-readable storage device, the modified event stream data may be generated based on the correction data by modifying an event of the event stream data, adding a first event to the event stream data, deleting a second event from the event stream data, or a combination thereof.

Another disclosed apparatus includes a processor. The processor is configured to receive event stream data. The event stream data includes a plurality of events associated with changes to an instance of a subject. The processor is further configured to receive input indicating correction data. The processor is further configured to output modified event stream data to a storage device. In a particular example of the apparatus, the apparatus is generated based on the correction data by modifying an event of the event stream data, adding a first event to the event stream data, deleting a second event from the event stream data, or a combination thereof.

In accordance with various embodiments of the present disclosure, the methods, functions, and modules described herein may be implemented by software programs executable by a computer system. Further, in exemplary embodiments, implementations can include distributed processing, component/object distributed processing, and parallel processing. Alternatively, virtual computer system processing can be used to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, or any combination thereof. The computer system may be connected, e.g., using a network, to other computer systems or peripheral devices. For example, the computer system or components thereof can include or be included within any one or more of the devices, systems, modules, and/or components illustrated in or described with reference to FIGS. 1-42. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method for generating event stream data associated with a plurality of subject instances, the method comprising:
   automatically loading event stream data, the event stream data including a plurality of events associated with changes to one or more attributes associated with at least one of a plurality of subject instances;
   automatically loading correction data, the correction data comprising a value of at least one attribute associated with at least one subject instance;
   generating modified event stream data, wherein generating the modified event stream data comprises:
      modifying an event of the event stream data based at least on the correction data;
      adding a first event to the event stream data based at least on the correction data;
      deleting a second event from the event stream data based at least on the correction data; or
      a combination thereof;
   generating a profile for each subject instance based on the modified event stream data, the profile comprising a chronology of changes in attributes associated with each subject instance, wherein the correction data is distinct from the event stream data, the modified event stream data, and the profile for each subject instance; and
   outputting the correction data to a storage device, wherein the correction data is reusable to generate second modified event stream data based on second event stream data.

2. The method of claim 1, wherein input indicating the correction data is received from an input device.

3. The method of claim 2, further comprising outputting a graphical user interface based on the event stream data to a display device, the input received responsive to the graphical user interface.

4. The method of claim 3, further comprising updating the graphical user interface based on the modified event stream data.

5. The method of claim 1, wherein the correction data includes second event stream data.

6. The method of claim 1, wherein the event stream data is received from the storage device.

7. A computer-readable storage device, storing instructions executable by a processor to perform operations, the operations comprising:
   automatically loading event stream data the event stream data including a plurality of events associated with changes to one or more attributes associated with at least one of a plurality of subject instances;
   automatically loading correction data, the correction data comprising a value of at least one attribute associated with at least one subject instance;
   generating modified event stream data, wherein generating the modified event stream data comprises:
      modifying an event of the event stream data based at least on the correction data;
      adding a first event to the event stream data based at least on the correction data;
      deleting a second event from the event stream data based at least on the correction data; or
      a combination thereof;
   generating a profile for each subject instance based on the modified event stream data, the profile comprising a chronology of changes in attributes associated with each subject instance, wherein the correction data is distinct from the event stream data, the modified event stream data, and the profile for each subject instance; and
   outputting the correction data to a storage device, wherein the correction data is reusable to generate second modified event stream data based on second event stream data.

8. The computer-readable storage device of claim 7, wherein input indicating the correction data is received from an input device.

9. The computer-readable storage device of claim 7, wherein the correction data includes second event stream data.

10. The computer-readable storage device of claim 8, wherein the operations further include outputting a display based on the event stream data to a display device, the input received responsive to the display.

11. The computer-readable storage device of claim 10, wherein the operations further include updating the display based on the modified event stream data.

12. The computer-readable storage device of claim 11, wherein the event stream data is received from the storage device.

13. An apparatus for generating event stream data associated with a plurality of subject instances, the apparatus comprising:
   a processor configured to:
      automatically load event stream data, the event stream data including a plurality of events associated with changes to one or more attributes associated with at least one of a plurality of subject instances;
      automatically load correction data, the correction data comprising a value of at least one attribute associated with at least one subject instance;
      generate modified event stream data, wherein generating the modified event stream data comprises:
         modifying an event of the event stream data based at least on the correction data;
         adding a first event to the event stream data based at least on the correction data;
         deleting a second event from the event stream data based at least on the correction data; or
         a combination thereof;
      generate a profile for each subject instance based on the modified event stream data, the profile comprising a chronology of changes in attributes associated with each subject instance, wherein the correction data is distinct from the event stream data, the modified event stream data, and the profile for each subject instance; and output the correction data to a storage device, wherein the correction data is reusable to generate second modified event stream data based on second event stream data.

14. The apparatus of claim 13, further comprising an interface device, wherein input indicating the correction data is received via the interface device.

15. The apparatus of claim 14, further comprising a display device, the processor further configured to output a display based on the event stream data to the display device, the input received responsive to the display.

16. The apparatus of claim 15, wherein the processor is further configured to update the display based on the modified event stream data.

17. The apparatus of claim 13, wherein the event stream data is received from the storage device.

* * * * *